US008725343B2

(12) United States Patent
Shimizu et al.

(10) Patent No.: US 8,725,343 B2
(45) Date of Patent: May 13, 2014

(54) CONTROL DEVICE FOR AUTOMATIC TRANSMISSION

(75) Inventors: Tetsuya Shimizu, Anjo (JP); Masamichi Yamaguchi, Anjo (JP); Kenichi Tsuchida, Anjo (JP); Naoyuki Fukaya, Anjo (JP); Kazunori Ishikawa, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 146 days.

(21) Appl. No.: 13/107,236

(22) Filed: May 13, 2011

(65) Prior Publication Data

US 2011/0301803 A1 Dec. 8, 2011

(30) Foreign Application Priority Data

May 17, 2010 (JP) ................. 2010-113273

(51) Int. Cl.
*G06F 7/00* (2006.01)
*G06G 7/70* (2006.01)
*F16H 61/00* (2006.01)
*F16H 61/12* (2010.01)
*F16H 61/16* (2006.01)

(52) U.S. Cl.
CPC ........... *F16H 61/00* (2013.01); *F16H 61/12* (2013.01); *F16H 61/16* (2013.01); *F16H 2061/168* (2013.01); *F16H 2061/1204* (2013.01); *F16H 2061/1232* (2013.01)
USPC .......... 701/29.1; 701/29.2; 701/29.7; 701/51; 701/55; 701/62; 477/96

(58) Field of Classification Search
USPC ............. 477/96, 906; 475/116, 119, 123, 133
See application file for complete search history.

(56) References Cited

U.S. PATENT DOCUMENTS 4,734,861 A * 3/1988 Bertolasi et al. ............... 701/67
4,887,491 A * 12/1989 Holbrook et al. ............... 477/34

(Continued)

FOREIGN PATENT DOCUMENTS

| JP | 11-280898 A * 10/1999 ........... F16H 61/16 |
| JP | A-2005-265101 9/2005 |
| JP | A-2007-146901 6/2007 |
| JP | A-2007-177933 7/2007 |

OTHER PUBLICATIONS

Jul. 5, 2011 International Search Report issued in PCT/JP2011/057910 (with translation).

(Continued)

*Primary Examiner* — John Q Nguyen
*Assistant Examiner* — Edward Torchinsky
(74) *Attorney, Agent, or Firm* — Oliff PLC

(57) ABSTRACT

A control device for an automatic transmission that outputs a command signal to an actuator to control the automatic transmission. The control device configured with a main control section that receives a state of the automatic transmission, that determines an abnormality in the automatic transmission on the basis of the input state of the automatic transmission, and that outputs to the actuator a main control section command signal for controlling the automatic transmission so as to establish a predetermined shift speed when it is determined that an abnormality is occurring in the automatic transmission; and a monitoring section that determines an abnormality in the main control section and that outputs to the actuator a monitoring section command signal for causing the automatic transmission to establish a neutral state irrespective of the main control section command signal when it is determined that an abnormality is occurring in the main control section.

6 Claims, 8 Drawing Sheets

(56) References Cited

U.S. PATENT DOCUMENTS

| | | | |
|---|---|---|---|
| 5,888,169 A * | 3/1999 | Jang | 477/130 |
| 5,921,885 A | 7/1999 | Tabata et al. | |
| 6,068,575 A * | 5/2000 | Tanizawa et al. | 477/144 |
| 7,047,117 B2 * | 5/2006 | Akiyama et al. | 701/48 |
| 7,402,123 B2 * | 7/2008 | Kobayashi et al. | 477/75 |
| 7,835,843 B2 * | 11/2010 | Kawamura et al. | 701/62 |
| 8,032,274 B2 * | 10/2011 | Niwa et al. | 701/31.8 |
| 8,100,803 B2 * | 1/2012 | Foster et al. | 475/116 |
| 8,210,990 B2 * | 7/2012 | Yoshioka et al. | 477/130 |
| 8,224,541 B2 * | 7/2012 | Yoshioka et al. | 701/62 |
| 8,281,681 B2 * | 10/2012 | Kimura et al. | 74/473.12 |
| 8,359,135 B2 * | 1/2013 | Kariya et al. | 701/31.4 |
| 2005/0209048 A1 | 9/2005 | Morise et al. | |
| 2007/0015624 A1 | 1/2007 | Ota et al. | |
| 2007/0117678 A1 | 5/2007 | Fukushima et al. | |
| 2007/0135986 A1 | 6/2007 | Kawamura et al. | |
| 2007/0161448 A1 | 7/2007 | Sato et al. | |
| 2010/0161187 A1 * | 6/2010 | Ito | 701/58 |
| 2011/0220823 A1 * | 9/2011 | Shimizu et al. | 251/129.15 |
| 2012/0271508 A1 * | 10/2012 | Kanemoto et al. | 701/33.6 |

OTHER PUBLICATIONS

Dec. 3, 2013 Extended European Search Report issued in European Patent Application No. 11783330.1.

* cited by examiner

F I G. 1
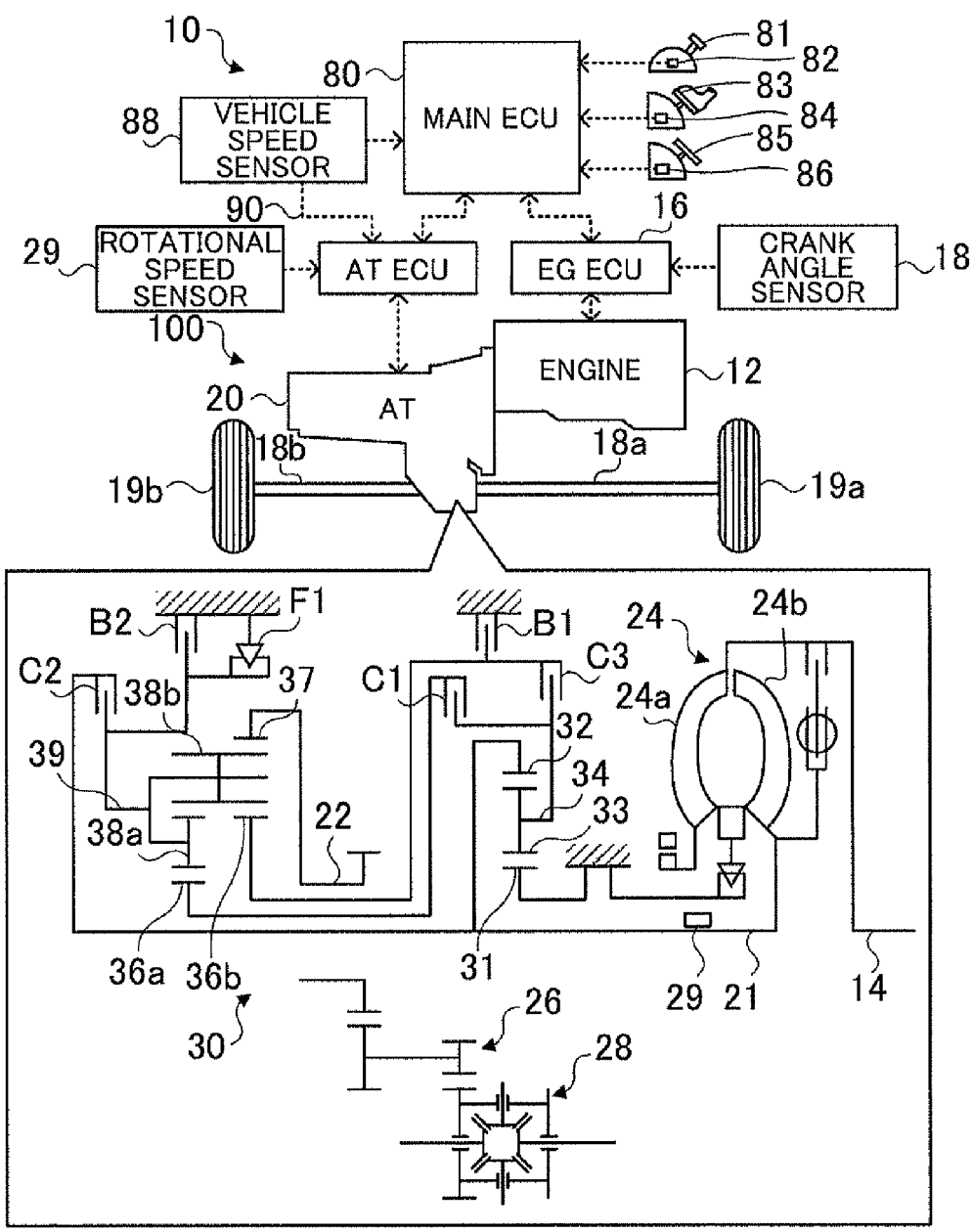

|   |      | C-1 | C-2 | C-3 | B-1 | B-2 | F-1 | SL1 | SL2 | SL3 | SL5 | S1  | S2 |
|---|------|-----|-----|-----|-----|-----|-----|-----|-----|-----|-----|-----|-----|
|   | P    |     |     |     |     |     |     |     |     |     |     |     |     |
|   | REV  |     |     | O   |     | O   |     |     |     |     |     |     |     |
|   | N    |     |     |     |     |     |     |     |     |     |     |     | O   |
| D | 1st  | O   |     |     | (O) |     | O   | O   |     | (O) |     | (O) |     |
|   | 2nd  | O   |     |     | O   |     |     | O   |     |     | O   |     |     |
|   | 3rd  | O   |     | O   |     |     |     | O   |     | O   |     |     |     |
|   | 4th  | O   | O   |     |     |     |     | O   | O   |     |     |     |     |
|   | 5th  |     | O   | O   |     |     |     |     | O   | O   |     |     |     |
|   | 6th  |     | O   |     | O   |     |     |     | O   |     | O   |     |     |

(O): ENGAGED WITH ENGINE BRAKE IN OPERATION

F I G . 5
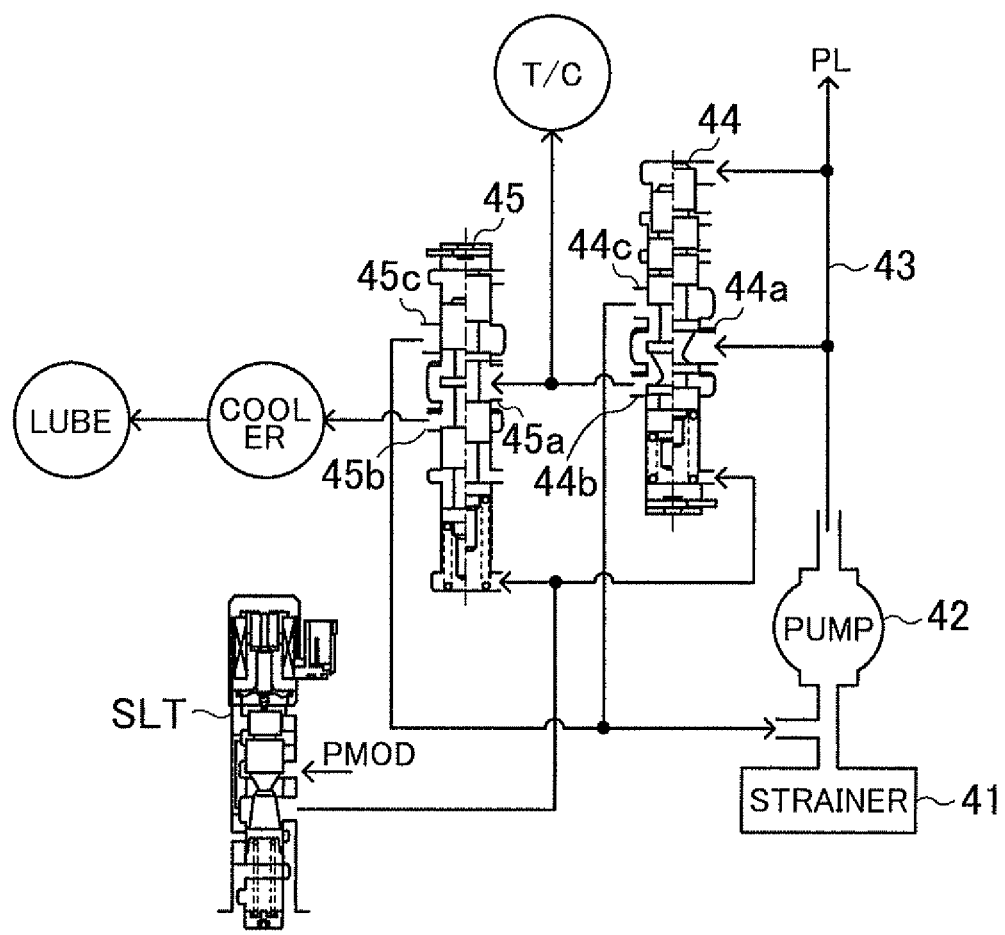

F I G . 7
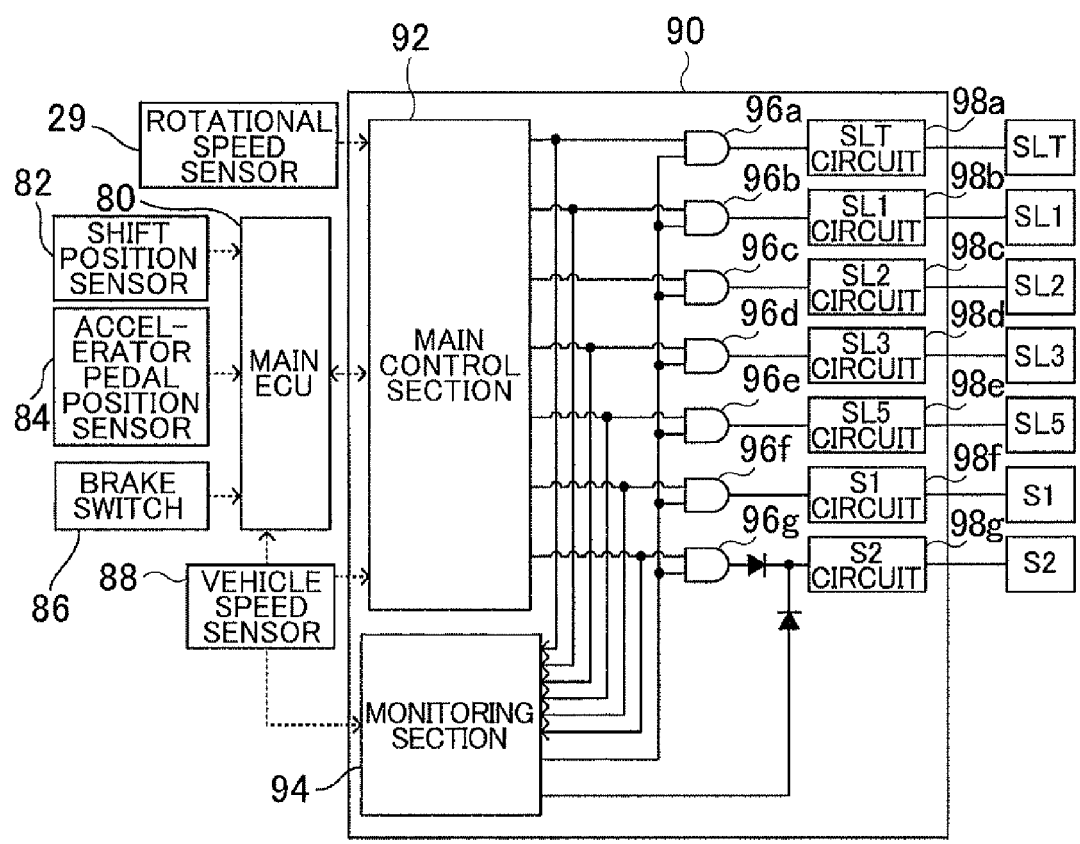

CONTROL DEVICE FOR AUTOMATIC TRANSMISSION

INCORPORATION BY REFERENCE

The disclosure of Japanese Patent Application No. 2010413273 filed on May 17, 2010 including the specification, drawings and abstract is incorporated herein by reference in its entirety.

BACKGROUND OF THE INVENTION

The present invention relates to a control device for an automatic transmission that outputs a command signal to an actuator to control the automatic transmission.

DESCRIPTION OF THE RELATED ART

An example of this type of automatic transmission proposed in the related art includes a hydraulic circuit that establishes a specific shift speed when an electrical failure occurs and all solenoids are de-energized (see Japanese Patent Application Publication No. JP-A-2005-265101, for example). The hydraulic circuit includes normally-closed solenoid valves SL1, SL2, and SL4 and a sequence valve that when a shift lever is in a drive (D) range, connects the solenoid valve SL1 to a C1 clutch, the solenoid valve SL2 to a C2 clutch, and the solenoid valve SL4 to a B2 brake during normal times, and connects a D-range oil passage of a manual valve, which outputs a line pressure when the shift lever is in the D range, to respective servos for either the C1 clutch or the C2 clutch and the B2 brake during a failure during which all the solenoid valves are de-energized. Consequently, the vehicle can travel continuously with either a third gear or a fifth gear established even during a failure.

SUMMARY OF THE INVENTION

With the hydraulic circuit configured to establish a specific shift speed during a failure as described above, the vehicle is allowed to travel continuously. However, failures of the automatic transmission are not necessarily an electrical failure discussed above, and various failure modes such as an abnormality in an ECU are conceivable. Thus, it is desirable to appropriately handle the various failure modes so as not to cause an unexpected shock or a secondary failure.

A main object of the present invention is to provide a control device for an automatic transmission that handles an abnormality in the automatic transmission or the control device for the automatic transmission more appropriately.

In order to achieve the foregoing main object, the control device for an automatic transmission adopts the following means.

A first aspect of the present invention provides a control device for an automatic transmission, which outputs a command signal to an actuator to control the automatic transmission. The control device for an automatic transmission includes:

a main control section that receives a state of the automatic transmission, that determines an abnormality in the automatic transmission on the basis of the input state of the automatic transmission, and that outputs to the actuator a main control section command signal for controlling the automatic transmission so as to establish a predetermined shift speed when it is determined that an abnormality is occurring in the automatic transmission; and a monitoring section that determines an abnormality in the main control section and that outputs to the actuator a monitoring section command signal for causing the automatic transmission to establish a neutral state irrespective of the main control section command signal when it is determined that an abnormality is occurring in the main control section.

In the control device for an automatic transmission according to the first aspect, the main control section determines an abnormality in the automatic transmission on the basis of the input state of the automatic transmission, and outputs to the actuator a main control section command signal for controlling the automatic transmission so as to establish a predetermined shift speed when it is determined that an abnormality is occurring in the automatic transmission, and the monitoring section determines an abnormality in the main control section, and outputs to the actuator a monitoring section command signal for causing the automatic transmission to establish a neutral state irrespective of the main control section command signal when it is determined that an abnormality is occurring in the main control section. Consequently, the main control section can handle an abnormality in the automatic transmission, and the monitoring section can handle an abnormality in the main control section. As a result, an abnormality in the automatic transmission can be more appropriately handled.

According to a second aspect of the present invention, in the control device for an automatic transmission, the monitoring section may receive a state of the automatic transmission and the main control section command signal output from the main control section, and determine an abnormality in the main control section on the basis of the input state of the automatic transmission and the main control section command signal. According to the second aspect, even if an abnormality occurs in the main control section command signal from the main control section, such an abnormality can be properly handled.

In the control device for an automatic transmission according to a third aspect of the present invention, which controls the automatic transmission which includes a hydraulic circuit including a plurality of solenoids as the actuator and in which the predetermined shift speed is established by de-energizing all the plurality of solenoids and the neutral state is established by energizing only a predetermined one of the plurality of solenoids and de-energizing the other solenoids, the main control section may output the main control section command signal to each of the plurality of solenoids; and the monitoring section may output a signal for energizing the predetermined solenoid and de-energizing the other solenoids as the monitoring section command signal when it is determined that an abnormality is occurring in the main control section. According to the third aspect, the monitoring section needs only to output a signal with a single pattern for any abnormality in the main control section. Thus, the configuration of the monitoring section can be simplified.

In the control device for an automatic transmission according to a fourth aspect of the present invention, in which the monitoring section receives the main control section command signal, the monitoring section may determine that an abnormality is occurring in the main control section and output to the actuator the monitoring section command signal for causing the automatic transmission to establish the neutral state when the input main control section command signal is a command for a change to a shift speed that is different from a shift speed that is normally taken from the input state of the automatic transmission. According to the fourth aspect, an abnormality in the main control section can be more reliably determined using a simple logic.

In the control device for an automatic transmission according to a fifth aspect of the present invention, in which the monitoring section receives the main control section command signal, when the actuator is drivably controlled on the basis of the input main control section command signal, the monitoring section may determine that an abnormality is occurring in the main control section and output to the actuator the monitoring section command signal for causing the automatic transmission to establish the neutral state when a rotational speed of the motor is predicted to exceed an allowable rotational speed. According to the fifth aspect, the motor can be prevented from rotating at a rotational speed exceeding the allowable rotational speed because of an abnormality in the main control section.

In the control device for an automatic transmission according to a sixth aspect of the present invention, in which the monitoring section receives the main control section command signal, when the actuator is drivably controlled on the basis of the input main control section command signal, the monitoring section may determine that an abnormality is occurring in the main control section and output to the actuator the monitoring section command signal for causing the automatic transmission to establish the neutral state when a degree of variation in speed reduction ratio of the automatic transmission is predicted to exceed a predetermined degree. According to the sixth aspect, occurrence of an excessive shock due to an abnormality in the main control section can be suppressed.

In the control device for an automatic transmission according to a seventh aspect of the present invention, the main control section may determine the abnormality by determining a shift speed that cannot be established, of the plurality of shift speeds, and setting a shift speed that can be established to output a command signal to the actuator.

In the control device for an automatic transmission according to an eighth aspect of the present invention, which controls the automatic transmission which includes, as the hydraulic circuit which supplies a hydraulic pressure to a hydraulic servo for a friction engagement element that establishes a shift speed: a pump that generates a hydraulic pressure; a first pressure regulation mechanism that includes a normally-open solenoid and that regulates the hydraulic pressure from the pump to generate a line pressure; a second pressure regulation mechanism that includes a normally-closed solenoid and that receives and regulates the line pressure to output the regulated pressure; a signal pressure output mechanism that includes a normally-closed solenoid to output a signal pressure; and a switching mechanism that is connected to oil passages for the respective mechanisms and an oil passage for the hydraulic servo and that includes a signal pressure oil passage to which at least the signal pressure from the signal pressure output mechanism can be input, the switching mechanism allowing communication between the oil passage for the first pressure regulation mechanism and the oil passage for the hydraulic servo and blocking communication between the oil passage for the second pressure regulation mechanism and the oil passage for the hydraulic servo when the signal pressure is not input to the signal pressure oil passage, and blocking communication between the oil passage for the first pressure regulation mechanism and the oil passage for the hydraulic servo and allowing communication between the oil passage for the second pressure regulation mechanism and the oil passage for the hydraulic servo when the signal pressure is input to the signal pressure oil passage, the monitoring section may output an on signal to the solenoid for the signal pressure output mechanism which serves as the predetermined solenoid. According to the eighth aspect, the hydraulic circuit can be reduced in size. In this case, the hydraulic pressure from the second pressure regulation mechanism may further be input to the signal pressure oil passage as the signal pressure.

BRIEF DESCRIPTION OF THE DRAWINGS

FIG. 1 shows a schematic configuration of an automobile 10;

FIG. 5 shows a schematic configuration of the hydraulic circuit 40, centered on a primary regulator valve 44 and a secondary regulator valve 45;

FIG. 7 is a block diagram showing functional blocks of an AT ECU 90;

DETAILED DESCRIPTION OF THE EMBODIMENTS

An embodiment of the present invention will be described below.

Figures 2, 3:
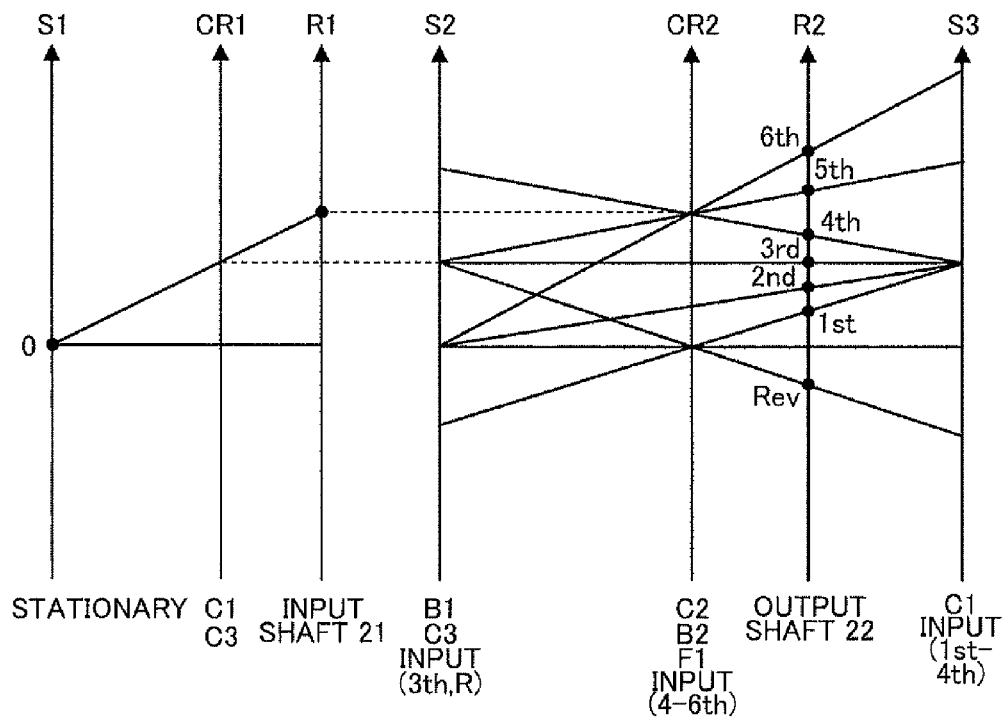
FIG. 2 shows an operation table of a speed change mechanism 30.
FIG. 3 illustrates the relationship between the respective rotational speeds of various rotary elements of the speed change mechanism 30 for various shift speeds.

FIG. 1 shows a schematic configuration of an automobile 10. FIG. 2 shows an operation table of a speed change mechanism 30.

As shown in FIG. 1, the automobile 10 includes an engine 12, an engine electronic control unit (engine ECU) 16, an automatic transmission 20, an automatic transmission electronic control unit (AT ECU) 90, and a main electronic control unit (main ECU) 80. The engine 12 is an internal combustion engine that outputs power generated by explosive combustion of a hydrocarbon fuel such as gasoline and light oil. The engine ECU 16 receives an operating state of the engine 12 from various sensors such as a crank angle sensor 18 that detects a crank angle to control an operation of the engine 12. The automatic transmission 20 incorporates a speed change mechanism 30 that is connected to a crankshaft 14 of the engine 12 and to axles 18a and 18b for left and right wheels 19a and 19b to transmit power from the engine 12 to the axles 18a and 18b. The AT ECU 90 controls the automatic transmission 20, and serves as the control device for an automatic transmission according to the embodiment. The main ECU 80 controls the entire vehicle. The automatic transmission 20 and the AT ECU 90 serving as the control device for an automatic transmission according to the embodiment form a transmission device 100. The main ECU 80 receives inputs of a shift position SP from a shift position sensor 82 that detects the operation position of a shift lever 81, an accelerator operation amount Acc from an accelerator pedal position sensor 84 that detects the depression amount of an accelerator pedal 83, a brake switch signal BSW from a brake switch 86 that detects depression of a brake pedal 85, a vehicle speed V from a vehicle speed sensor 88, and so forth, via an input port. In addition, the main ECU 80 is connected to the engine ECU 16 and the AT ECU 90 to be discussed later via a communication port to exchange various control signals and data with the engine ECU 16 and the AT ECU 90.

Figure 4:
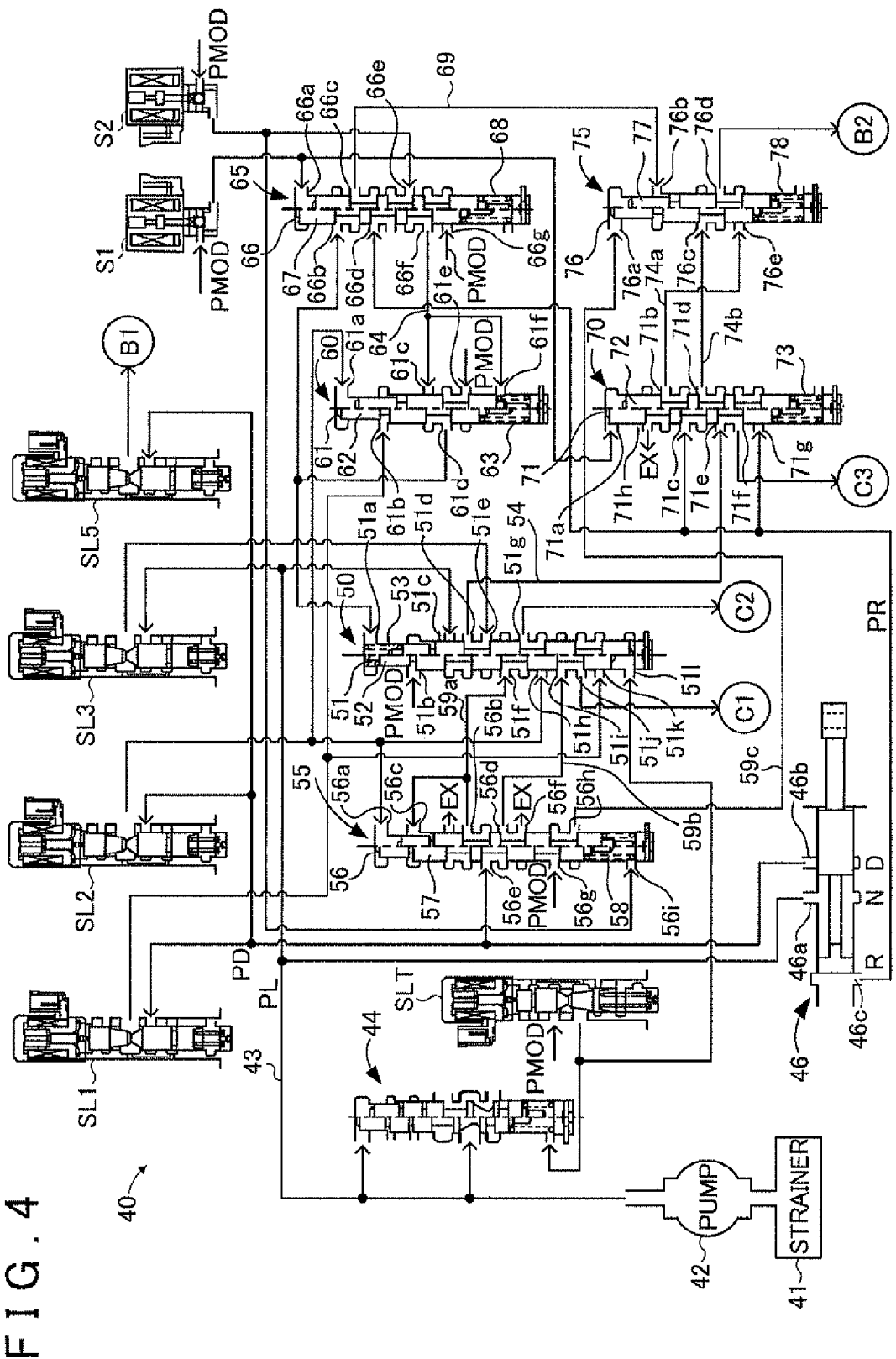
FIG. 4 shows a schematic configuration of a hydraulic circuit 40.

As shown in FIG. 1, the automatic transmission 20 includes a torque converter 24, the stepped speed change mechanism 30, and a hydraulic circuit 40 (see FIG. 4). The torque converter 24 is provided with a lock-up clutch including a pump impeller 24a on the input side connected to the crankshaft 14 of the engine 12 and a turbine runner 24b on the output side. The stepped speed change mechanism 30 includes an input shaft 21 connected to the turbine runner 24b of the torque converter 24 and an output shaft 22 connected to the axles 18a and 18b via a gear mechanism 26 and a differential gear 28, and outputs to the output shaft 22 power input to the input shaft 21 while changing the speed. The hydraulic circuit 40 serves as an actuator that drives the speed change mechanism 30. In the embodiment, the torque converter 24 is interposed between the crankshaft 14 of the engine 12 and the speed change mechanism 30. However, the present invention is not limited thereto, and various starting devices may be adopted.

The speed change mechanism 30 is formed as a 6-speed stepped speed change mechanism, and includes a single-pinion type planetary gear mechanism, a Ravigneaux type planetary gear mechanism, three clutches C1, C2, and C3, two brakes B1 and B2, and a one-way clutch FL The single-pinion type planetary gear mechanism includes a sun gear 31 which is an externally toothed gear, a ring gear 32 which is an internally toothed gear disposed concentrically with the sun gear 31, a plurality of pinion gears 33 meshed with the sun gear 31 and meshed with the ring gear 32, and a carrier 34 that rotatably and revolvably holds the plurality of pinion gears 33. The sun gear 31 is fixed to a case. The ring gear 32 is connected to the input shaft 21. The Ravigneaux type planetary gear mechanism includes two sun gears 36a and 36b which are each an externally toothed gear, a ring gear 37 which is an internally toothed gear, a plurality of short pinion gears 38a meshed with the sun gear 36a, a plurality of long pinion gears 38b meshed with the sun gear 36b and the plurality of short pinion gears 38a and meshed with the ring gear 37, and a carrier 39 that couples the plurality of short pinion gears 38a and the plurality of long pinion gears 38b to each other and that rotatably and revolvably holds the gears 38a and the gears 38b. The sun gear 36a is connected to the carrier 34 of the single-pinion type planetary gear mechanism via the clutch C1. The sun gear 36b is connected to the carrier 34 via the clutch C3, and connected to the case via the brake B1. The ring gear 37 is connected to the output shaft 22. The carrier 39 is connected to the input shaft 21 via the clutch C2. The carrier 39 is also connected to the case via the one-way clutch F1, and connected to the case via the B2 which is provided in parallel with the one-way clutch F1.

As shown in FIG. 2, the speed change mechanism 30 can switchably establish first to sixth forward speeds, a reverse speed, and a neutral state by turning on and off the clutches C1 to C3 and turning on and off the brakes B1 and B2 in combination. The reverse speed can be established by turning on the clutch C3 and the brake B2 and turning off the clutches C1 and C2 and the brake B1. The first forward speed can be established by turning on the clutch C1 and turning off the clutches C2 and C3 and the brakes B1 and B2. When the engine brake is in operation, the first forward speed can be established with the brake B2 turned on. The second forward speed can be established by turning on the clutch C1 and the brake B1 and turning off the clutches C2 and C3 and the brake B2. The third forward speed can be established by turning on the clutches C1 and C3 and turning off the clutch C2 and the brakes B1 and B2. The fourth forward speed can be established by turning on the clutches C1 and C2 and turning off the clutch C3 and the brakes B1 and B2. The fifth forward speed can be established by turning on the clutches C2 and C3 and turning off the clutch C1 and the brakes B1 and B2. The sixth forward speed can be established by turning on the clutch C2 and the brake B1 and turning off the clutches C1 and C3 and the brake B2. The neutral state can be established by turning off all the clutches C1 to C3 and the brakes B1 and B2. FIG. 3 illustrates the relationship between the respective rotational speeds of the various rotary elements of the speed change mechanism 30 for the various shift speeds. In the drawing, the S1 axis represents the rotational speed of the sun gear 33, the CR1 axis represents the rotational speed of the carrier 34, the R1 axis represents the rotational speed of the ring gear 32, the S2 axis represents the rotational speed of the sun gear 36b, the S3 axis represents the rotational speed of the sun gear 36a, the CR2 axis represents the rotational speed of the carrier 39, and the R2 axis represents the rotational speed of the ring gear 37.

The clutches C1 to C3 and the brakes B1 and B2 in the speed change mechanism 30 are turned on and off (engaged and disengaged) by the hydraulic circuit 40 shown in FIGS. 4 and 5. As shown in FIG. 4, the hydraulic circuit 40 is formed by components including: a mechanical oil pump 42; a primary regulator valve 44; a linear solenoid valve SLT; a manual valve 46; a linear solenoid valve SL1; a linear solenoid valve SL2; a linear solenoid valve SL3; a linear solenoid valve SL5; a first clutch application relay valve 50; a second clutch application relay valve 55; a first solenoid relay valve 60 and a second solenoid relay valve 65; a C3-B2 application control valve 70; a B2 application control valve 75; a first on/off solenoid valve S1; and a second on/off solenoid valve S2. The mechanical oil pump 42 sucks hydraulic oil via a strainer 41 and pumps the hydraulic oil into a line pressure oil passage 43 using power from the engine 12. The primary regulator valve 44 regulates the pressure of the hydraulic oil pumped from the mechanical oil pump 42 to generate a line pressure PL. The linear solenoid valve SLT drives the primary regulator valve 44 by regulating the line pressure PL to generate a modulator pressure PMOD via a modulator valve (not shown) to output the modulator pressure PMOD as a signal pressure. The manual valve 46 is formed with an input port 46a that receives the line pressure PL, a D (drive)-position output port 46b, and a R (reverse)-position output port 46c. The manual valve 46 allows communication between the input port 46a and the D-position output port 46b and blocks communication between the input port 46a and the R-position output port 46c when the shift lever 81 is operated to the D position. Further, the manual valve 46 blocks communication between the input port 46a and the D-position output port 46b and allows communication between the input port 46a and the R-position output port 46c when the shift lever 81 is operated to the R position. The manual valve 46 blocks communication between the input port 46a and the D-position output port 46b and communication between the input port 46a and the R-position output port 46c when the shift lever 81 is operated to the N position. The linear solenoid valve SL1 receives and regulates a drive pressure PD which is a pressure output from the D-position output port 46b to output the regulated pressure. The linear solenoid valve SL2 receives and regulates the drive pressure PD to output the regulated pressure. The linear solenoid valve SL3 receives and regulates the line pressure PL from the line pressure oil passage 43 to output the regulated pressure. The linear solenoid valve SL5 receives and regulates the drive pressure PD to output the regulated pressure to the brake B1. The first clutch application relay valve 50 selectively switches between a normal mode, in which an SL1 pressure which is a pressure output from the linear solenoid valve SL1 is supplied to the clutch C1, an SL2 pressure which is a pressure output from the linear solenoid valve SL2 is supplied to the clutch C2, and an SL3 pressure which is a pressure output from the linear solenoid valve SL3 is supplied to one of the clutch C3 and the brake B2, and a fail-safe mode, in which the drive pressure PD is supplied to one of the clutch C1 and the clutch C2 and the line pressure PL is supplied to the clutch C3. The second clutch application relay valve 55 switches between a third forward speed mode, in which the drive pressure PD is supplied to the clutch C1 and the line pressure PL is supplied to the clutch C3, and a fifth forward speed mode, in which the drive pressure PD is supplied to the clutch C2 and the line pressure PL is supplied to the clutch C3, when the first clutch application relay valve 50 is in the fail-safe mode. The first solenoid relay valve 60 and the second solenoid relay valve 65 output the modulator pressure PMOD to switch between the modes (the normal mode and the fail-safe mode) of the first clutch application relay valve 50. The C3-B2 application control valve 70 switches among a mode in which the SL3 pressure is supplied to the clutch C3, a mode in which the line pressure PL is supplied to the clutch C3 and a reverse pressure PR which is a pressure output from the R-position output port 46c is supplied to the brake B2, a mode in which the reverse pressure PR is supplied to the clutch C3 and the brake B2, and a mode in which the SL3 pressure is supplied to the brake B2. The B2 application control valve 75 switches among a mode in which the SL3 pressure from the C3-B2 application control valve 70 is supplied to the brake B2, a mode in which the reverse pressure PR is supplied to the brake B2, and a mode in which the hydraulic pressure acting on the brake B2 is drained. The first on/off solenoid valve S1 drives the second solenoid relay valve 65 and the C3-B2 application control valve 70. The second on/off solenoid valve S2 outputs a signal pressure (S2 pressure) for switching between the modes of the first clutch application relay valve 50 via the first solenoid relay valve 60 and the second solenoid relay valve 65 instead of the modulator pressure PMOD. In the embodiment, only the linear solenoid valve SLT, of the solenoid valves SLT, SL1 to SL3, SL5, S1, and S2, is formed as a normally-open solenoid valve which is open when a solenoid coil of the solenoid valve is de-energized, and the other solenoid valves SL1 to SL3, SL5, S1, and S2 are each formed as a normally-closed solenoid valve which is closed when a solenoid coil of the solenoid valve is de-energized.

As shown in FIG. 4, the first clutch application relay valve 50 includes a sleeve 51 formed with various ports, a spool 52 that slides in the sleeve 51 to allow and block communication between the various ports, and a spring 53 that presses an end surface of the spool 52. The various ports formed in the sleeve 51 include: a first signal pressure port 51a that receives the modulator pressure PMOD and the S2 pressure from the first solenoid relay valve 60 as a signal pressure for pressing an end surface of the spool 52 in the same direction as the urging force of the spring 53; a second signal pressure port 51b that inputs the modulator pressure PMOD to a space between lands of the spool 52 with different diameters as a signal pressure; an input port 51c that receives the line pressure PL from the line pressure oil passage 43; an output port 51d connected to a C3-B2 communication oil passage 54 coupled to the C3-B2 application control valve 70; an input port 51e that receives the SL3 pressure of the linear solenoid valve SL3; an input port 51f connected to a fifth forward speed communication oil passage 59a coupled to the second clutch application relay valve 55; an output port 51g connected to the clutch C2 (hydraulic servo); an input port 51h that receives the SL2 pressure of the linear solenoid valve SL2; an output port 51i connected to a third forward speed communication oil passage 59b coupled to the second clutch application relay valve 55; an output port 51j connected to the clutch C1 (hydraulic servo); an input port 51k that receives the SL1 pressure of the linear solenoid valve SL1; and a third signal pressure port 51l that receives an SLT pressure which is a pressure output from the linear solenoid valve SLT as a signal pressure for pressing an end surface of the spool 52 in the opposite direction to the urging force of the spring 53.

In the first clutch application relay valve 50, the signal pressure input to the second signal pressure port 51b presses the spool 52 in the same direction as the urging force of the spring 53 because of a pressure difference due to the difference in diameter between lands (difference in pressure receiving area). The spool 52 is moved in accordance with the balance relationship among the urging force of the spring 53, a force produced by the signal pressure input to the first signal pressure port 51a to press the spool 52 in the same direction as the urging force of the spring 53, a force produced by the signal pressure input to the second signal pressure port 51b to press the spool 52 in the same direction as the urging force of the spring 53, and a force produced by the signal pressure input to the third signal pressure port 51l to press the spool 52 in the opposite direction to the urging force of the spring 53. On the other hand, when the modulator pressure PMOD or the S2 pressure is input to the first signal pressure port 51a, the resultant force of the urging force of the spring 53, the pressing force from the first signal pressure port 51a, and the pressing force from the second signal pressure port 51b exceeds the pressing force from the third signal pressure port 51l to move the spool 52 in the direction of expanding the spring 53 (toward the position indicated on the right half when FIG. 4 is seen sideways). At this time, communication between the input port 51e on the linear solenoid valve SL3 side and the output port 51d on the C3-B2 communication oil passage 54 side is allowed, communication between the input port 51h on the linear solenoid valve SL2 side and the output port 51g on the clutch C2 side is allowed, communication between the input port 51k on the linear solenoid valve SL1 side and the output port 51j on the clutch C1 side is allowed, communication between the input port 51c on the line pressure oil passage 43 side and the output port 51d on the C3-B2 communication oil passage 54 side is blocked, communication between the input port 51f on the fifth forward speed communication oil passage 59a side and the output port 51g on the clutch C2 side is blocked, and communication between the input port 51i on the third forward speed communication oil passage 59b side and the output port 51j on the clutch C1 side is blocked. On the other hand, when the modulator pressure PMOD or the S2 pressure is not input to the first signal pressure port 51a, the pressing force from the third signal pressure port 51l exceeds the resultant force of the urging force of the spring 53 and the pressing force from the second signal pressure port 51b to move the spool 52 in the direction of contracting the spring 53 (toward the position indicated on the left half when FIG. 4 is seen sideways). At this time, communication between the input port 51e on the linear solenoid valve SL3 side and the output port 51d on the C3-B2 communication oil passage 54 side is blocked, communication between the input port 51h on the linear solenoid valve SL2 side and the output port 51g on the clutch C2 side is blocked, communication between the input port 51k on the linear solenoid valve SD side and the output port 51j on the clutch C1 side is blocked, communication between the input port 51c on the line pressure oil passage 43 side and the output port 51d on the C3-B2 communication oil passage 54 side is allowed, communication between the input port 51f on the fifth forward speed communication oil passage 59a side and the output port 51g on the clutch C2 side is allowed, and communication between the input port 51i on the third forward speed communication oil passage 59b side and the output port 51j on the clutch C1 side is allowed.

As shown in FIG. 4, the second clutch application relay valve 55 includes a sleeve 56 formed with various ports, a spool 57 that slides in the sleeve 56 to allow and block communication between the various ports, and a spring 58 that presses an end surface of the spool 57. The various ports formed in the sleeve 56 include: a first signal pressure port 56a that receives the SL2 pressure of the linear solenoid valve SL2 as a signal pressure for pressing an end surface of the spool 57 in the opposite direction to the urging force of the spring 58; an output port 56b connected to the fifth forward speed communication oil passage 59a; a second signal pressure port 56c connected to the fifth forward speed communication oil passage 59a to input a hydraulic pressure in the oil passage 59a to a space between lands of the spool 57 with different diameters a as a signal pressure; an output port 56d connected to the third forward speed communication oil passage 59b; an input port 56e that receives the drive pressure PD; a drain port 56f; an input port 56g that receives the modulator pressure PMOD; an output port 56h connected to a communication oil passage 59c coupled to the B2 application control valve 75; and a third signal pressure port 56i that receives the S2 pressure of the second on/off solenoid valve S2 as a signal pressure for pressing an end surface of the spool 57 in the same direction as the urging force of the spring 58.

In the second clutch application relay valve 55, the signal pressure input to the second signal pressure port 56c presses the spool 57 in the opposite direction to the urging force of the spring 58 because of a pressure difference due to the difference in diameter between lands (difference in pressure receiving area). The spool 57 is moved in accordance with the balance relationship among the urging force of the spring 58, a force produced by the signal pressure input to the first signal pressure port 56a to press the spool 57 in the opposite direction to the urging force of the spring 58, a force produced by the signal pressure input to the second signal pressure port 56c to press the spool 57 in the opposite direction to the urging force of the spring 58, and a force produced by the signal pressure input to the third signal pressure port 56i to press the spool 57 in the same direction as the urging force of the spring 58. When the SL2 pressure of the linear solenoid valve SL2 is not input to the first signal pressure port 56a, the urging force of the spring 58 moves the spool 57 in the direction of expanding the spring 58 (toward the position indicated on the left half when FIG. 4 is seen sideways). At this time, communication between the input port 56e on the drive pressure PD side and the output port 56d on the third forward speed communication oil passage 59b side is allowed, and communication between the input port 56e on the drive pressure PD side and the fifth forward speed communication oil passage 59a is blocked. On the other hand, when the SL2 pressure of the linear solenoid valve SL2 is input to the first signal pressure port 56a, the pressing force from the first signal pressure port 56a exceeds the urging force of the spring 58 to move the spool 57 in the direction of contracting the spring 58 (toward the position indicated on the right half when FIG. 4 is seen sideways). At this time, communication between the input port 56e on the drive pressure PD side and the output port 56d on the third forward speed communication oil passage 59b side is blocked, and communication between the input port 56e on the drive pressure PD side and the fifth forward speed communication oil passage 59a is allowed. Once the SL2 pressure of the linear solenoid valve SL2 is input to the first signal pressure port 56a, the drive pressure PD introduced into the fifth forward speed communication oil passage 59a is input to the second signal pressure port 56c via the input port 56e and the output port 56b so that the drive pressure PD presses the spool 57 in the opposite direction to the urging force of the spring 58. Therefore, even if the SL2 pressure is canceled thereafter, the spool 57 is held at the same position.

As shown in FIG. 4, the first solenoid relay valve 60 includes a sleeve 61 formed with various ports, a spool 62 that slides in the sleeve 61 to allow and block communication between the various ports, and a spring 63 that presses an end surface of the spool 62. The various ports formed in the sleeve 61 include: a first signal pressure port 61a that receives the SL2 pressure of the linear solenoid valve SL2 as a signal pressure for pressing an end surface of the spool 62 in the opposite direction to the urging force of the spring 63; a second signal pressure port 61b that inputs the SL1 pressure of the solenoid valve SL1 to a space between lands of the spool 62 with different diameters as a signal pressure; an input port 61c connected to a communication oil passage 64 coupled to the second solenoid relay valve 65; an output port 61d coupled to the first signal pressure port 51a of the first clutch application relay valve 50; an input port 61e that receives the modulator pressure PMOD; and a second signal pressure port 61f that receives a hydraulic pressure in the communication oil passage 64 as a signal pressure for pressing an end surface of the spool 62 in the same direction as the urging force of the spring 63.

In the first solenoid relay valve 60, the signal pressure input to the second signal pressure port 61b presses the spool 62 in the opposite direction to the urging force of the spring 63 because of a pressure difference due to the difference in diameter between lands of the spool 62 (difference in pressure receiving area). The spool 62 is moved in accordance with the balance relationship among the urging force of the spring 63, a force produced by the signal pressure input to the first signal pressure port 61a to press the spool 62 in the opposite direction to the urging force of the spring 63, a force produced by the signal pressure input to the second signal pressure port 61b to press the spool 62 in the opposite direction to the urging force of the spring 63, and a force produced by the signal pressure input to the third signal pressure port 61f to press the spool 62 in the same direction as the urging force of the spring 63. When the SL2 pressure of the linear solenoid valve SL2 is not input to the first signal pressure port 61a and the SL1 pressure of the linear solenoid valve SL1 is not input to the second signal pressure port 61b either, the urging force of the spring 63 moves the spool 62 in the direction of expanding the spring 63 (toward the position indicated on the left half when FIG. 4 is seen sideways). At this time, communication between the input port 61e on the modulator pressure PMOD side and the output port 61d on the side of the first signal pressure port 51a of the first clutch application relay valve 50 is blocked, and communication between the input port 61c on the communication oil passage 64 side and the output port 61d on the side of the first signal pressure port 51a of the first clutch application relay valve 50 is allowed; On the other hand, when the SL2 pressure of the linear solenoid valve SL2 is input to the first signal pressure port 61a or the SL1 pressure of the linear solenoid valve SL1 is input to the second signal pressure port 61b, the pressing force of the SL1 pressure or the pressing force of the SL2 pressure exceeds the urging force of the spring 63 to move the spool 62 in the direction of contracting the spring 63 (toward the position indicated on the right half when FIG. 4 is seen sideways). At this time, communication between the input port 61e on the modulator pressure PMOD side and the output port 61d on the side of the first signal pressure port 51a of the first clutch application relay valve 50 is allowed, and communication between the input port 61c on the communication oil passage 64 side and the output port 61d on the side of the first signal pressure port 51a of the first clutch application relay valve 50 is blocked.

As shown in FIG. 4, the second solenoid relay valve 65 includes a sleeve 66 formed with various ports, a spool 67 that slides in the sleeve 66 to allow and block communication between the various ports, and a spring 68 that presses an end surface of the spool 67. The various ports formed in the sleeve 66 include: a signal pressure port 66a that receives the S1 pressure of the first on/off solenoid valve S1 as a signal pressure for pressing an end surface of the spool 67 in the opposite direction to the urging force of the spring 68; an input port 66b coupled to the output port 61d of the first solenoid relay valve 60; an output port 66c connected to a communication oil passage 69 coupled to the B2 application control valve 75; an input port 66d that receives the reverse pressure PR; an input port 66e that receives the S2 pressure of the second on/off solenoid valve 52; an output port 66f connected to the communication oil passage 64 coupled to the first solenoid relay valve 60; and an input port 66g that receives the modulator pressure PMOD.

In the second solenoid relay valve 65, when the S1 pressure of the first on/off solenoid valve S1 is not input to the signal pressure port 66a, the urging force of the spring 68 moves the spool 67 in the direction of expanding the spring 68 (toward the position indicated on the left half when FIG. 4 is seen sideways). At this time, communication between the input port 66b on the side of the output port 61d of the first solenoid relay valve 60 and the output port 66c on the communication oil passage 69 side is allowed, communication between the input port 66e on the second on/off solenoid valve S2 side and the output port 66f on the communication oil passage 64 side is allowed, and communication between the input port 66g on the modulator pressure PMOD side and the output port 66f is blocked. On the other hand, when the S1 pressure of the first on/off solenoid valve S1 is input to the signal pressure port 66a, the pressing force of the S1 pressure exceeds the urging force of the spring 68 to move the spool 67 in the direction of contracting the spring 68 (toward the position indicated on the right half when FIG. 4 is seen sideways). At this time, communication between the input port 66b on the side of the output port 61d of the first solenoid relay valve 60 and the output port 66c on the communication oil passage 69 side is blocked, communication between the input port 66e on the second on/off solenoid valve S2 side and the output port 66f on the communication oil passage 64 side is blocked, and communication between the input port 66g on the modulator pressure PMOD side and the output port 66f is allowed.

As shown in FIG. 4, the C3-B2 application control valve 70 includes a sleeve 71 formed with various ports, a spool 72 that slides in the sleeve 71 to allow and block communication between the various ports, and a spring 73 that presses an end surface of the spool 72. The various ports formed in the sleeve 71 include: a signal pressure port 71a that receives the S1 pressure of the first on/off solenoid valve S1 as a signal pressure for pressing an end surface of the spool 72 in the opposite direction to the urging force of the spring 73; an output port 71b connected to a first communication oil passage 74a coupled to the B2 application control valve 75; an input port 71c that receives the reverse pressure PR; an output port 71d connected to a second communication oil passage 74b coupled to the B2 application control valve 75; an input port 71e connected to the C3-B2 communication oil passage 54 on the first clutch application relay valve 50 side; an output port 71f connected to the clutch C3 (hydraulic servo); an input port 71g that receives the reverse pressure PR; and a drain port 71h.

In the C3-B2 application control valve 70, when the S1 pressure of the first on/off solenoid valve S1 is not input to the signal pressure port 71a, the urging force of the spring 73 moves the spool 72 in the direction of expanding the spring 73 (toward the position indicated on the left half when FIG. 4 is seen sideways). At this time, communication between the output port 71b on the side of the first communication oil passage 74a coupled to the B2 application control valve 75 and the drain port 71h is allowed, communication between the input port 71c on the reverse pressure PR side and the output port 71b on the first communication oil passage 74a side is blocked, communication between the input port 71c and the output port 71d on the side of the second communication oil passage 74b coupled to their application control valve 75 is allowed, communication between the input port 71e on the side of the C3-B2 communication oil passage 54 coupled to the first clutch application relay valve 50 and the output port 71d on the second communication oil passage 74b side is blocked, communication between the input port 71e and the output port 71f on the clutch C3 side is allowed, and communication between the input port 71g on the reverse pressure PR side and the output port 71f is blocked. On the other hand, when the S1 pressure of the first on/off solenoid valve S1 is input to the signal pressure port 71a, the pressing force of the S1 pressure exceeds the urging force of the spring 73 to move the spool 72 in the direction of contracting the spring 73 (toward the position indicated on the right half when FIG. 4 is seen sideways). At this time, communication between the output port 71b on the side of the first communication oil passage 74a coupled to the B2 application control valve 75 and the drain port 71h is blocked, communication between the input port 71c on the reverse pressure PR side and the output port 71b on the first communication oil passage 74a side is allowed, communication between the input port 71c and the output port 71d on the side of the second communication oil passage 74b coupled to the B2 application control valve 75 is blocked, communication between the input port 71e on the side of the C3-B2 communication oil passage 54 coupled to the first clutch application relay valve 50 and the output port 71d on the second communication oil passage 74b side is allowed, communication between the input port 71e and the output port 71f on the clutch C3 side is blocked, and communication between the input port 71g on the reverse pressure PR side and the output port 71f is allowed.

As shown in FIG. 4, the B2 application control valve 75 includes a sleeve 76 formed with various ports, a spool 77 that slides in the sleeve 76 to allow and block communication between the various ports, and a spring 78 that presses an end surface of the spool 77. The various ports formed in the sleeve 76 include: a first signal pressure port 76a that receives a hydraulic pressure (the modulator pressure PMOD) from the output port 56h of the second clutch application relay valve 55 as a signal pressure for pressing an end surface of the spool 77 in the opposite direction to the urging force of the spring 78; a second signal pressure port 76b that inputs a pressure output from the output port 66c (the communication oil passage 69) of the second solenoid relay valve 65 to a space between lands of the spool 76 with different diameters as a signal pressure; an input port 76c connected to the second communication oil passage 74b coupled to the C3-B2 application control valve 70; an output port 76d connected to the brake B2 (hydraulic servo); and an input port 76e connected to the first communication oil passage 74a coupled to the C3-B2 application control valve 70.

In the B2 application control valve 75, when a signal pressure is input to none of the first signal pressure port 76a and the second signal pressure port 76b, the urging force of the spring 78 moves the spool 77 in the direction of expanding the spring 78 (toward the position indicated on the left half when FIG. 4 is seen sideways). At this time, communication between the input port 76c on the second communication oil passage 74b side and the output port 76d on the brake B2 side is allowed, and communication between the input port 76e on the first communication oil passage 74a side and the output port 76d is blocked. On the other hand, when a signal pressure is input to either of the first signal pressure port 76a and the second signal pressure port 76b, the pressing force of the signal pressure exceeds the urging force of the spring 78 to move the spool 77 in the direction of contracting the spring 78 (toward the position indicated on the right half when FIG. 4 is seen sideways). At this time, communication between the input port 76e on the second communication oil passage 74b side and the output port 76d on the brake B2 side is blocked, and communication between the input port 76e on the first communication oil passage 74a side and the output port 76d is allowed.

Figure 6:
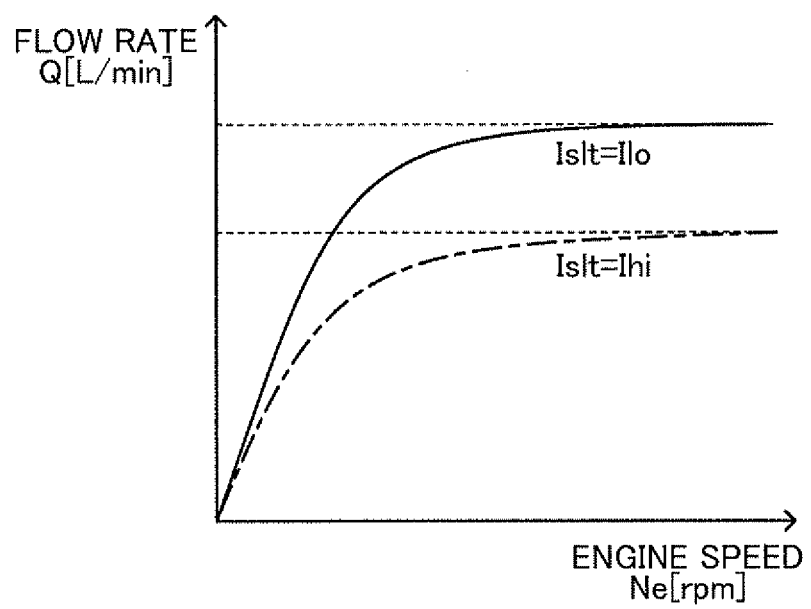
FIG. 6 shows an exemplary relationship among a current Islt applied to a linear solenoid valve SLT (an electromagnetic coil), an engine speed Ne, and a flow rate Q of hydraulic oil supplied to a cooler and a portion to be lubricated.

As shown in FIG. 5, the hydraulic circuit 40 includes a secondary regulator valve 45 provided at a stage later than the primary regulator valve 44. The primary regulator valve 44 receives hydraulic oil pumped from the mechanical oil pump 42 at an input port 44a and outputs part of the received hydraulic oil from a secondary port 44b, which is coupled to the torque converter 24, and a drain port 44c to regulate the line pressure PL. The secondary regulator valve 45 receives hydraulic oil from the secondary port 44b at an input port 45a and outputs part of the received hydraulic oil from a cooling/lubrication port 45b, which is coupled to a cooler (COOLER) and a portion to be lubricated (LUBE), and a drain port 45c to regulate a secondary pressure. The primary regulator valve 44 and the secondary regulator valve 45 are driven by the normally-open linear solenoid valve SLT. FIG. 6 shows an exemplary relationship among a current Islt applied to the linear solenoid valve SLT (an electromagnetic coil), an engine speed Ne, and a flow rate Q of hydraulic oil supplied to the cooler and the portion to be lubricated. As shown, the flow rate Q of hydraulic oil supplied to the cooler and the portion to be lubricated tends to become higher as the engine speed Ne becomes higher and as the current Islt becomes lower.

In the thus configured hydraulic circuit 40, the neutral state can be established by turning on the second on/off solenoid valve S2. The first forward speed can be established by turning on the linear solenoid valve SL1. When the engine brake is in operation, the first forward speed can be established by further turning on the first on/off solenoid valve S1 and turning on the linear solenoid valve SL3. The second forward speed can be established by turning on the linear solenoid valves SL1 and SL5. The third forward speed can be established by turning on the linear solenoid valves SL1 and SL3. The fourth forward speed can be established by turning on the linear solenoid valves SL1 and SL2. The fifth forward speed can be established by turning on the linear solenoid valves SL2 and SL3. The sixth forward speed can be established by turning on the linear solenoid valves SL2 and SL5.

Now, a case where the shift lever 81 is operated to the D (drive) position is considered. In this case, the vehicle is normally running using any of the first to sixth forward speeds. Thus, as shown in the engagement table of FIG. 2, the first solenoid relay valve 60 is driven by either the SL1 pressure from the linear solenoid valve SL1 or the SL2 pressure from the linear solenoid valve SL2, and the modulator pressure PMOD is input to the first signal pressure port 51a of the first clutch application relay valve 50. Therefore, the first clutch application relay valve 50 is switched to the normal mode, in which the linear solenoid valve SL1 (output port) is connected to the clutch C1 via the input port 51k and the output port 51j of the first clutch application relay valve 50, the linear solenoid valve SL2 (output port) is connected to the clutch C2 via the input port 51h and the output port 51g, and the linear solenoid valve SL3 is connected to the C3-B2 communication oil passage 54 via the input port 51e and the output port 51d. When the first on/off solenoid valve S1 is turned off, communication between the input port 71e of the C3-B2 application control valve 70 connected to the C3-B2 communication oil passage 54 and the output port 71f connected to the clutch C3 is allowed. Thus, the linear solenoid valve SL3 is connected to the clutch C3 via the input port 51e and the output port 51d of the first clutch application relay valve 50, the C3-B2 communication oil passage 54, and the input port 71e and the output port 71f of the C3-B2 application control valve 70. Thus, the vehicle can travel with any of the first to sixth forward speeds established by driving corresponding ones of the linear solenoid valves SL1 to SL5. When the engine brake is in operation, the first on/off solenoid valve S1 is turned on to allow communication between the input port 71e of the C3-B2 application control valve 70 on the C3-B2 communication oil passage 54 side and the output port 71d on the second communication oil passage 74b side instead of communication between the input port 71e and the output port 71f on the clutch C3 side. In this state, the second communication oil passage 74b is connected to the brake B2 via the input port 76c and the output port 76d of the B2 application control valve 75. Therefore, the linear solenoid valve SL3 is connected to the brake B2 instead of the clutch C3. Thus, the brake B2 can be turned on by supplying the SL3 pressure from the linear solenoid valve SL3 to the brake B2.

A case where all the solenoid valves SLT, SL1 to SL5, S1, and S2 are de-energized with the shift lever 81 operated to the D position is considered. In this case, the linear solenoid valves SL1 and SL2 do not output the SL1 pressure and the SL2 pressure, respectively. Thus, communication between the input port 61e, to which the modulator pressure PMOD is input, of the first solenoid relay valve 60 and the output port 61d, which is coupled to the first signal pressure port 51a of the first clutch application relay valve 50, is blocked so that the modulator pressure PMOD is not input to the first signal pressure port 51a. Therefore, the first clutch application relay valve 50 is switched to the fail-safe mode, in which the third forward speed communication oil passage 59b is connected to the clutch C1 via the input port 51i and the output port 51j of the first clutch application relay valve 50, the fifth forward speed communication oil passage 59a is connected to the clutch C2 via the input port 51f and the output port 51g, and the line pressure oil passage 43 is connected to the C3-B2 communication oil passage 54 via the input port 51c and the output port 51d. Since the first on/off solenoid valve S1 is turned off, communication between the input port 71e, which is connected to the C3-B2 communication oil passage 54, of the C3-B2 application control valve 70 and the output port 71f connected to the clutch C3 is allowed, and the line pressure oil passage 43 is connected to the clutch C3 via the input port 51c and the output port 51d of the first clutch application relay valve 50, the C3-B2 communication oil passage 54, and the input port 71e and the output port 71f of the C3-B2 application control valve 70. In the second clutch application relay valve 55, the drive pressure PD is supplied to the third forward speed communication oil passage 59b when the SL2 pressure is not output from the linear solenoid valve SL2, and the drive pressure PD is output to the fifth forward speed communication oil passage 59a when the SL2 pressure is output from the linear solenoid valve SL2. Thus, in the fail-safe mode, when the vehicle is running using any of the first to third forward speeds, the third forward speed is established with the drive pressure PD supplied from the third forward speed communication oil passage 59b to the clutch C1 and the line pressure PL supplied to the clutch C3. Also, when the vehicle is running using any of the fourth to sixth forward speeds, the fifth forward speed is established with the drive pressure PD supplied from the fifth forward speed communication oil passage 59a to the clutch C2 and the line pressure PL supplied to the clutch C3.

Further, a case where only the second on/off solenoid valve S2, of the solenoid valves SLT, SL1 to SL5, S1, and S2, is energized and the other solenoid valves are de-energized with the shift lever 81 operated to the D position is considered. Also in this case, the linear solenoid valves SL1 and SL2 do not output the SL1 pressure and the SL2 pressure, respectively. Thus, the modulator pressure PMOD is not input to the first signal pressure port 51a of the first clutch application relay valve 50 from the first solenoid relay valve 60. In the first solenoid relay valve 60, communication between the output port 61d connected to the first signal pressure port 51a of the first clutch application relay valve 50 and the input port 61c connected to the communication oil passage 64 is allowed. In the second solenoid relay valve 65, since the S1 pressure is not input to the signal pressure port 66a from the first on/off solenoid valve S1, communication between the output port 66f connected to the communication oil passage 64 and the input port 66e connected to the second on/off solenoid valve S2 is allowed. Thus, the second on/off solenoid valve S2 is connected to the first signal pressure port 51a of the first clutch application relay valve 50 via the input port 66e and the output port 66f of the second solenoid relay valve 65, the communication oil passage 64, and the input port 61c and the output port 61d of the first solenoid relay valve 60, and the S2 pressure from the second on/off solenoid valve S2 can switch the first clutch application relay valve 50 to the normal mode in which supply of the drive pressure PD to the clutches C1 and C2 and supply of the line pressure PL to the clutch C3 are allowed. At this time, since all the linear solenoid valves SL1, SL2, SL3, and SL5 are turned off, all the clutches C1 to C3 and the brakes B1 and B2 are turned off to establish the neutral state. In this way, with the shift lever 81 operated to the D position, the third or fifth forward speed can be established when all the solenoid valves SLT, SL1 to SL5, S1, and S2 are de-energized, and the neutral state can be established when only the second on/off solenoid valve S2 is energized and the other solenoid valves are de-energized.

Next, a case where all the solenoid valves SLT, SL1 to SL5, S1, and S2 are de-energized with the shift lever 81 operated to the R (reverse) position is considered. In this case, in the second solenoid relay valve 65, the spool 67 is moved to the position indicated on the left half when FIG. 4 is seen sideways to block communication between the input port 66g to which the modulator pressure PMOD is input and the output port 66f connected to the communication oil passage 64. In the first solenoid relay valve 60, communication between the input port 61e to which the modulator pressure PMOD is input and the output port 61d coupled to the first signal pressure port 51a of the first clutch application relay valve 50 is blocked. Therefore, in the first clutch application relay valve 50, the spool 52 is moved to the position indicated on the left half when FIG. 4 is seen sideways to allow communication between the input port 51c to which the line pressure PL is input and the output port 51d connected to the C3-B2 communication oil passage 54. In the C3-B2 application control valve 70, the spool 72 is moved to the position indicated on the left half when FIG. 4 is seen sideways to allow communication between the input port 71e connected to the C3-B2 communication oil passage 54 and the output port 71f connected to the clutch C3 and communication between the input port 71c to which the reverse pressure PR is input and the output port 71d connected to the second communication oil passage 74b. In the B2 application control valve 75, communication between the input port 76c connected to the second communication oil passage 74b and the output port 76d connected to the brake B2 is allowed. Thus, the line pressure PL is supplied to the clutch C3 and the reverse pressure PR is supplied to the brake B2 to establish the reverse speed.

A case where only the first on/off solenoid valve S1, of the solenoid valves SLT, SL1 to SL5, S1, and S2, is energized with the shift lever 81 operated to the R position is considered. In the second solenoid relay valve 65, the spool 67 is moved to the position indicated on the right half when FIG. 4 is seen sideways to allow communication between the input port 66g to which the modulator pressure PMOD is input and the output port 66f connected to the communication oil passage 64 and communication between the input port 66d to which the reverse pressure PR is input and the output port 66c connected to the communication oil passage 69. In the first solenoid relay valve 60, communication between the input port 61c connected to the communication oil passage 64 and the output port 61d connected to the first signal pressure port 51a of the first clutch application relay valve 50 is allowed. Therefore, in the first clutch application relay valve 50, the spool 52 is moved to the position indicated on the right half when FIG. 4 is seen sideways to block communication between the input port 51c to which the line pressure PL is input and the output port 51d connected to the C3-B2 communication oil passage 54. In the C3-B2 application control valve 70, the spool 72 is moved to the position indicated on the right half when FIG. 4 is seen sideways to allow communication between the input port 71c to which the reverse pressure PR is input and the output port 71b connected to the first communication oil passage 74a and communication between the input port 71g to which the reverse pressure PR is input and the output port 71f connected to the clutch C3. In the B2 application control valve 75, the reverse pressure PR is input to the second signal pressure port 76b via the output port 66b and the output port 66c of the second solenoid relay valve 65 and the communication oil passage 69. Therefore, the spool 77 is moved to the position indicated on the right half when FIG. 4 is seen sideways to allow communication between the input port 76e connected to the first communication oil passage 74a and the output port 76d connected to the brake B2. Thus, the reverse pressure PR is supplied to the clutch C3 and the brake B2 to establish the reverse speed.

Further, a case where only the second on/off solenoid valve S2, of the solenoid valves SLT, SL1 to SL5, S1, and S2, is energized and the other solenoid valves are de-energized with the shift lever 81 operated to the R (reverse) position is considered. In this case, in the second solenoid relay valve 65, the spool 67 is moved to the position indicated on the left half when FIG. 4 is seen sideways to block communication between the input port 66g to which the modulator pressure PMOD is input and the output port 66f connected to the communication oil passage 64. In the first solenoid relay valve 60, communication between the input port 61e to which the modulator pressure PMOD is input and the output port 61*d* connected to the first signal pressure port 51*a* of the first clutch application relay valve 50 is blocked. However, in the second solenoid relay valve 65, communication between the input port 66*e* connected to the second on/off solenoid valve S2 and the output port 66*f* connected to the communication oil passage 64 is allowed. In the first solenoid relay valve 60, communication between the input port 61*c* connected to the communication oil passage 64 and the output port 61*d* connected to the first signal pressure port 51*a* of the first clutch application relay valve 50 is allowed. Therefore, the S2 pressure is input to the first signal pressure port 51*a* from the second on/off solenoid valve S2 to block communication between the input port 51*c* to which the line pressure PL is input and the output port 51*d* connected to the C3-B2 communication oil passage 54. Thus, the line pressure PL is not output to the clutch C3. In the B2 application control valve 75, communication between the input port 66*b* coupled to the output port 61*d* to which the S2 pressure of the first solenoid relay valve 60 is output and the output port 66*c* connected to the communication oil passage 69 is allowed. In the second clutch application relay valve 55, communication between the input port 56*i* connected to the second on/off solenoid valve S2 and the output port 56*h* connected to the communication oil passage 59*c* is allowed. Therefore, in the B2 application control valve 75, the S2 pressure from the communication oil passage 59*c* is input to the first signal pressure port 76*a*, and the S2 pressure from the communication oil passage 69 is input to the second signal pressure port 76*b*, which moves the spool 77 to the position indicated on the right half when FIG. 4 is seen sideways to allow communication between the input port 76*e* connected to the first communication oil passage 74*a* and the output port 76*d* connected to the brake 132. In the C3-B2 application control valve 70, communication between the output port 71*b* connected to the first communication oil passage 74*a* and the drain port 71*h* is allowed. Thus, the hydraulic pressure acting on the brake B2 is drained via the input port 76*e* and the output port 76*d* of the B2 application control valve 75, the first communication oil passage 74*a*, and the output port 71*b* and the drain port 71*h* of the C3-B2 application control valve 70. The neutral state is thus established.

The first clutch application relay valve 50 includes the third signal pressure port 51*l* to which a hydraulic pressure from the linear solenoid valve SLT is input as a signal pressure. Therefore, the spool 52 can be moved to the position indicated on the right half when FIG. 4 is seen sideways to establish the neutral state, as in the case where the S2 pressure from the second on/off solenoid valve S2 is input to the first signal pressure port 51*a*, by causing the linear solenoid valve SLT to output a low hydraulic pressure, that is, by applying a high current Ihi to the normally-open linear solenoid valve (an electromagnetic coil) SLT, instead of energizing only the second on/off solenoid valve S2. However, as shown in FIG. 6, when the high current Ihi is applied to the linear solenoid valve SLT, the hydraulic oil may not be sufficiently supplied to the cooler or the portion to be lubricated to result in insufficient cooling or insufficient lubrication. The configuration and the operation of the hydraulic circuit 40 have been described above.

As shown in the functional block diagram of FIG. 7, the AT ECU 90 includes a main control section 92 that governs processes performed in the entire automatic transmission 20, a monitoring section 94 that monitors the state of the main control section 92, an SLT circuit 98*a*, an SL1 circuit 98*b*, an SL2 circuit 98*c*, an SL3 circuit 98*d*, an SL5 circuit 98*e*, an S1 circuit 98*f*, and an S2 circuit 98*g* serving as drive circuits that drive the solenoid valves SLT, SL1, SL2, SL3, SL5, S1, and S2, respectively, and AND circuits 96*a* to 96*g* each having two input terminals to which a signal from the main control section 92 and a signal from the monitoring section 94 are input and an output terminal that outputs to the circuits 98*a* to 98*g*, respectively, the logical sum of the signals input to the two input terminals. Each of the main control section 92 and the monitoring section 94 is formed as a microprocessor including a CPU as its main component, and includes a ROM that stores a processing program, a RAM that temporarily stores data, input and output ports, and a communication port in addition to the CPU. The main control section 92 and the monitoring section 94 may be formed as a single chip, or may be formed separately from each other. The main control section 92 receives the vehicle speed. V detected by the vehicle speed sensor 88, an input shaft speed Nin from a rotational speed sensor 29 attached to the input shaft 21 of the automatic transmission 20, and so forth via an input port. The main control section 92 outputs solenoid command signals for driving the solenoid valves SLT, SL1, SL2, SL3, SL5, S1, and S2 and so forth to corresponding ones of the AND circuits 96*a* to 96*g* via an output port. Also, the main control section 92 communicates with the main ECU 80, and receives data such as the shift position SP from the shift position sensor 82, the accelerator operation amount Acc from the accelerator pedal position sensor 84, and the brake switch signal BSW from the brake switch 86 through communication via the main ECU 80. The monitoring section 94 receives the vehicle speed V detected by the vehicle speed sensor 88 and so forth via an input port separately from the main control section 92, and receives the solenoid command signals output from the main control section 92 and so forth via an input port. The monitoring section 94 outputs an on/off signal to the AND circuits 96*a* to 96*g*, and outputs a solenoid command signal for driving the S2 circuit 98*g* to the S2 circuit 98*g* not via the AND circuit 96*g*. Thus, when the main control section 92 outputs solenoid command signals with the monitoring section 94 outputting an on signal (a permission signal) to the AND circuits 96*a* to 96*g*, the solenoid command signals are output to corresponding ones of the drive circuits 98*a* to 98*g*. However, when the main control section 92 outputs solenoid command signals with the monitoring section 94 outputting an off signal (a prohibition signal) to the AND circuits 96*a* to 96*g*, output of the solenoid command signals to the drive circuits is blocked. In the embodiment, as discussed above, only the linear solenoid valve SLT, of the solenoid valves SLT, SL1 to SL3, SL5, S1, and S2, is formed as a normally-open solenoid valve, and the other solenoid valves SL1 to SL3, SL5, S1, and S2 are each formed as a normally-closed solenoid valve. Therefore, the neutral state can be established by outputting an on signal to the S2 circuit 98*g* with the monitoring section 94 outputting an off signal (a prohibition signal) to block output of solenoid command signals from the main control section 92 to the drive circuits.

Figure 8:
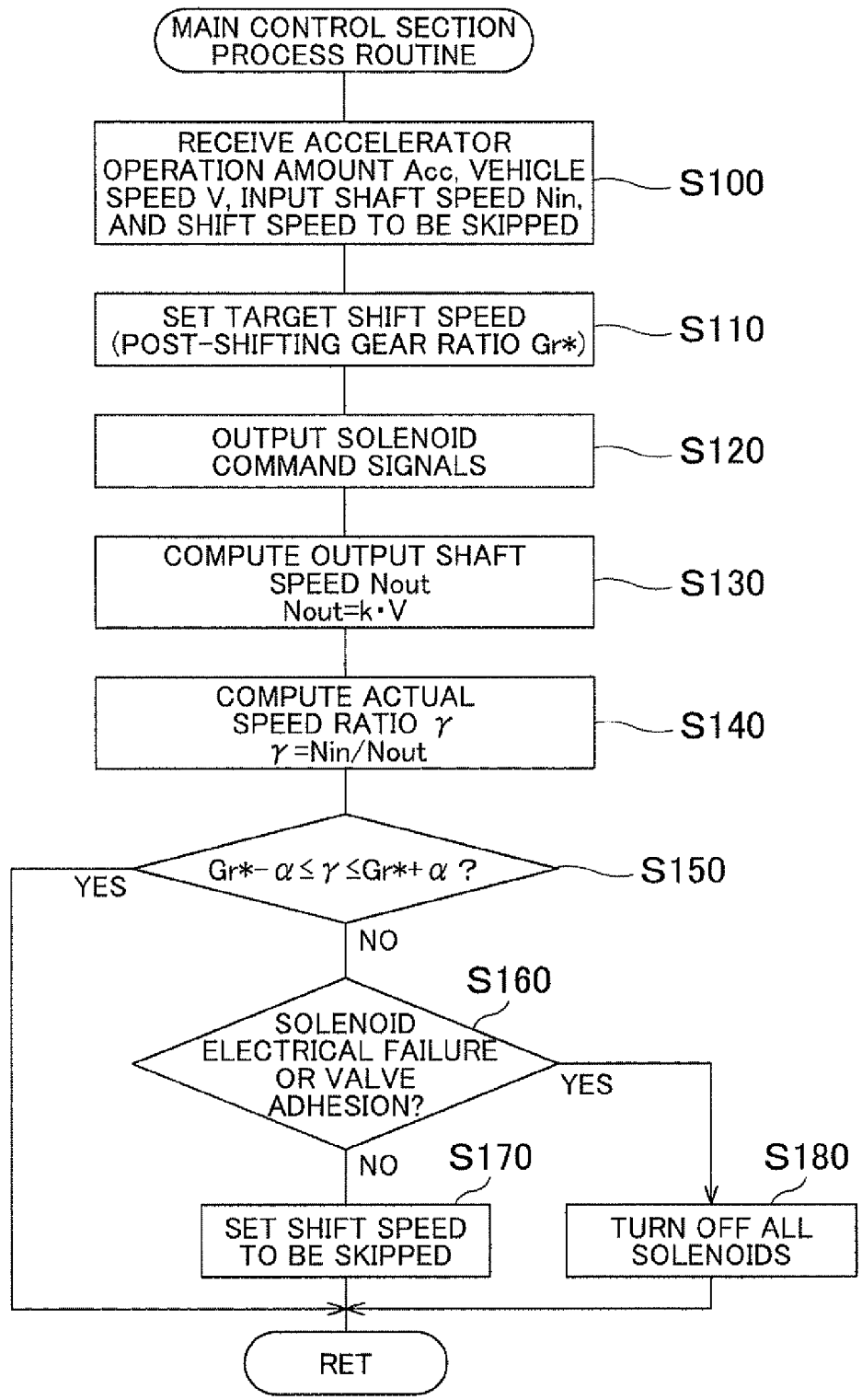
FIG. 8 is a flowchart showing an exemplary main control section process routine executed by a main control section 92.

Next, an operation of the transmission device 100 configured as described above, specifically operations of the main control section 92 and the monitoring section 94 of the AT ECU 90, will be described. The operation of the main control section 92 will be described first, and the operation of the monitoring section 94 will be described thereafter. FIG. 8 is a flowchart showing an exemplary main control section process routine executed by the main control section 92 of the AT ECU 90. The routine is executed repeatedly at predetermined time intervals (for example, at intervals of several milliseconds).

When the main control section process routine is started, the main control section 92 first receives data required for control such as the accelerator operation amount Acc, the vehicle speed V from the vehicle speed sensor 88, the input shaft speed Nin from the rotational speed sensor 29, and a shift speed to be skipped as a state of the automatic transmission 20 (step S100). The accelerator operation amount Acc is detected by the accelerator pedal position sensor 84 and input from the main ECU 80 through communication. The shift speed to be skipped is set in step S170 to be discussed later. When such data are input, a target shift speed is set on the basis of the input accelerator operation amount Acc and vehicle speed V using a shift map (step S110). Solenoid command signals are output to corresponding ones of the solenoid valves SLT, SL1 to SL5, S1, and S2 in accordance with the set target shift speed (step S120). Subsequently, the input vehicle speed V is multiplied by a conversion coefficient k to compute an output shaft speed Nout, which is the rotational speed of the output shaft 22 (step S130). The input input shaft speed Nin is divided by the computed output shaft speed Nout to compute an actual speed ratio γ (step S140). It is determined whether or not the computed actual speed ratio γ falls within an allowable gear ratio range defined by a lower limit value (Gr*−α), which is obtained by subtracting a margin a from a post-shifting gear ratio Gr* which is obtained as the gear ratio of the target shift speed set in step S110, and an upper limit value (Gr*+α), which is obtained by adding the margin a to the post-shifting gear ratio Gr* (step S150). If the effective gear ratio γ falls within the allowable rotational speed range, the routine is terminated. On the other hand, if the effective gear ratio γ does not fall within the allowable gear ratio range, it is further determined whether or not an electrical failure (solenoid electrical failure) such as a wire break or a short circuit is occurring in any of the solenoid valves SLT, SL1 to SL5, S1, and S2 or whether or not a valve stick (adhesion) is occurring in any of the solenoid valves SLT, SL1 to SL5, S1, and S2, the relay valves 60 and 65, and the control valves 70 and 75 (step S160). A solenoid electrical failure can be determined by comparing a solenoid current for the solenoid valves SLT, SL1 to SL5, 51, and S2 detected by a current sensor (not shown) with a corresponding solenoid command signal (on/off), for example. A valve stick can be determined by a hydraulic pressure sensor (not shown) attached to an oil passage in the hydraulic circuit 40 detecting a hydraulic pressure value that does not occur in the case where the valve position is normal, for example. If it is determined that either failure of a solenoid electrical failure and a valve stick is not occurring, the shift speed indicated by the target shift speed is set as a shift speed to be skipped (step S170). The routine is thus terminated. Consequently, when the routine is executed subsequently, the shift speed to be skipped is input in step S100 so that the target shift speed is selected from shift speeds that can be established other than the shift speed to be skipped in step S110. On the other hand, if it is determined that either failure of a solenoid electrical failure and a valve stick is occurring, all the solenoid valves SLT, SL1 to SL5, S1, and S2 are turned off (step S180). The routine is thus terminated. As discussed above, with all the solenoid valves SLT, SL1 to SL5, S1, and S2 turned off, the third forward speed is exclusively established while the vehicle is running using any of the first to third forward speeds, and the fifth forward speed is exclusively established while the vehicle is running using any of the fourth to sixth forward speeds. Such setting of a shift speed to be skipped and exclusive establishment of a shift speed are performed on the assumption that the solenoid command signals set in step S120 are normal and not erroneous. In case of an error in the command signals themselves, such an error is handled in a process performed by the monitoring section 94 to be discussed later.

Figure 9:
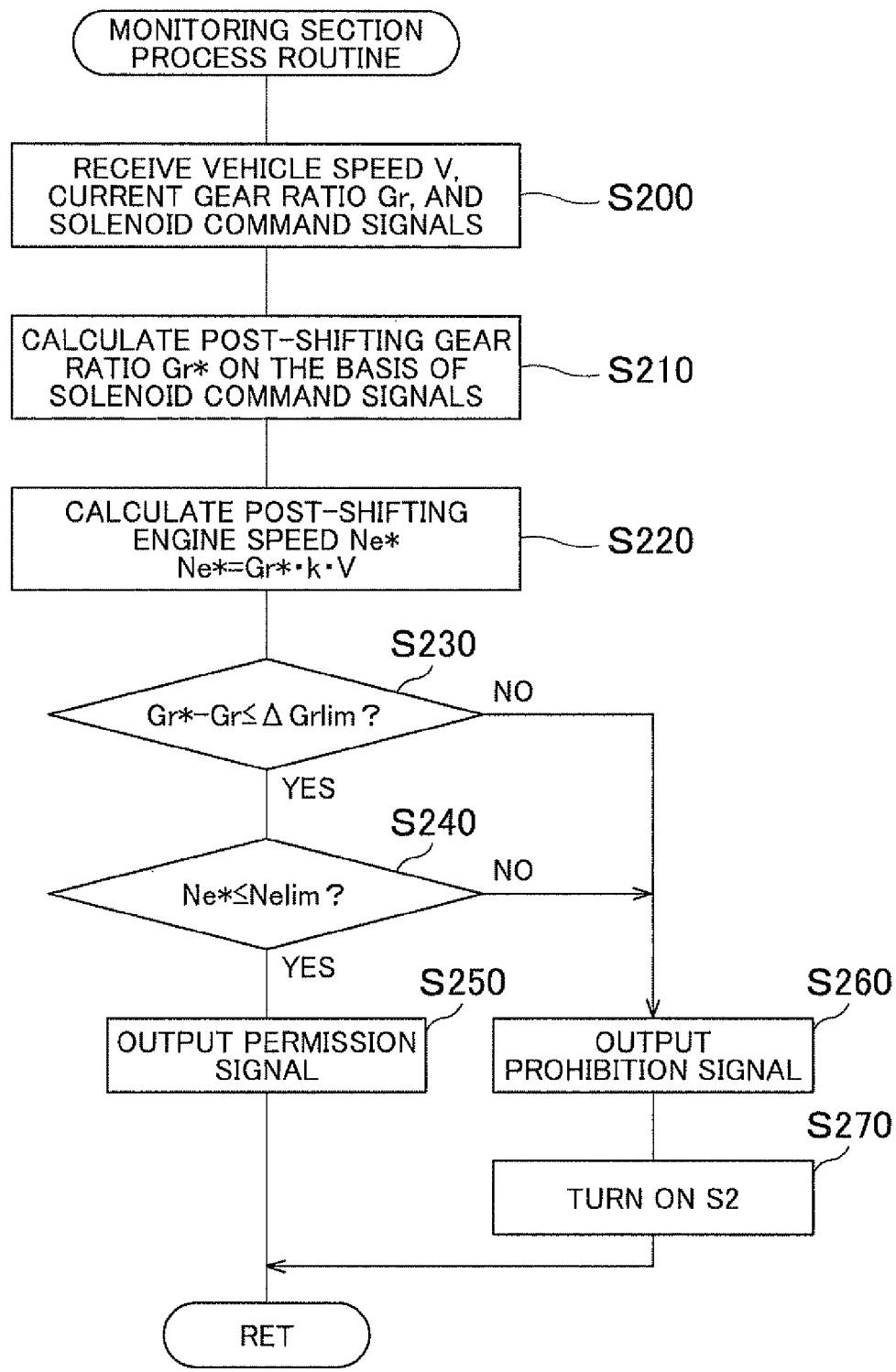
FIG. 9 is a flowchart showing an exemplary monitoring section process routine executed by a monitoring section 94.

Next, the operation of the monitoring section 94 will be described. FIG. 9 is a flowchart showing an exemplary monitoring section process routine executed by the monitoring section 94 of the AT ECU 90. The routine is executed repeatedly at predetermined time intervals (for example, at intervals of several milliseconds).

When the monitoring section process routine is started, the monitoring section 94 first receives data required for control such as the vehicle speed V from the vehicle speed. sensor 88, the current gear ratio Gr, and solenoid command signals output from the main control section 92 (step S200). The current gear ratio Gr is obtained as the gear ratio of the currently established shift speed. Subsequently, the input solenoid command signals are analyzed to calculate a post-shifting gear ratio Gr* which is the gear ratio of a shift speed established after shifting performed on the basis of the solenoid command signals (step S210). The calculated post-shifting gear ratio Gr* is multiplied by the conversion coefficient k and the vehicle speed V to calculate a post-shifting engine speed Ne* (step S220). It is determined whether or not a gear ratio variation amount (Gr*−Gr), which is the deviation between the post-shifting gear ratio Gr* and the current gear ratio Gr, is equal to or less than an allowable gear ratio variation amount ΔGrlim (step S230). Then, it is determined whether or not the post-shifting engine speed Ne* is equal to or less than an allowable rotational speed Nelim of the engine 12 (step S240). The allowable gear ratio variation amount ΔGrlim defines the amount of variation in gear ratio with which a shift shock (deceleration) of the vehicle exceeds an allowable range. The allowable rotational speed Nelim is set as a rotational speed that is slightly lower than the upper limit rotational speed of the engine 12. It may be said that the determinations in steps S230 and S240 are made to determine a shift command that is not made if the solenoid command signals from the main control section 92 are normal and not erroneous such as a downshift from the sixth forward speed to the first forward speed, for example. If the gear ratio variation amount is equal to or less than the allowable gear ratio variation amount ΔGrlim and the post-shifting engine speed Ne* is equal to or less than the allowable rotational speed Nelim, a permission signal (an on signal) is output to the AND circuits 96a to 96g (step S250). The routine is thus terminated. Consequently, the solenoid command signals output from the main control section 92 are output to corresponding ones of the circuits 98a to 98g via the AND circuits 96a to 96g to drive the solenoid valves SLT, SL1 to SL5, S1, and S2. On the other hand, if it is determined that the gear ratio variation amount is not equal to or less than the allowable gear ratio variation amount ΔGrlim or it is determined that the post-shifting engine speed Ne* is not equal to or less than the allowable rotational speed Nelim, it is determined that an abnormality such as a data corruption due to a communication failure, for example, occurs in the solenoid command signals from the main control section 92. Then, a prohibition signal (an off signal) is output to the AND circuits 96a to 96g (step S260). An on signal (energization signal) is output to the S2 signal (step S270). The routine is thus terminated. Consequently, the solenoid command signals output from the main control section 92 are blocked by the AND circuits 96a to 96g so that the linear solenoid valves SLT and SL1 to SL5 and the first on/off solenoid valve S1 are de-energized and only the second on/off solenoid valve 52 is energized to establish the neutral state. Thus, even if an abnormality occurs in the main control section 92 so that abnormal solenoid command signals are output, no unexpected shock occurs in the vehicle and the upper limit rotational speed of the engine 12 is not exceeded.

According to the control device for an automatic transmission of the embodiment described above, the main control section 92 determines a shift speed that cannot be established and sets a shift speed that can be established to output a solenoid command signal to the drive circuit (the SLT circuit 98a, the SL1 circuit 98b, the SL2 circuit 98c, the SL3 circuit 98d, the SL5 circuit 98e, the S1 circuit 98f, the S2 circuit 98g) corresponding to the solenoid valve SLT, SL1 to SL5, S1, S2 corresponding to the set shift speed. The monitoring section 94 determines an abnormality in the main control section 92, and blocks transfer of the solenoid command signal from the main control section 92 to the drive circuit and outputs an on signal (energization signal) to the S2 circuit 98g for the second on/off solenoid valve S2 to establish the neutral state when it is determined that an abnormality is occurring in the main control section 92. Thus, any abnormality in the automatic transmission can be appropriately handled using the main control section 92 and the monitoring section 94. In addition, the determination is made in accordance with whether or not the gear ratio variation amount, which is the deviation between the post-shifting gear ratio Gr* and the current gear ratio Gr, is equal to or less than the allowable gear ratio variation amount ΔGrlim and whether or not the post-shifting engine speed Ne* is equal to or less than the allowable rotational speed Nelim of the engine 12. Thus, the vehicle is not subjected to an excessive shock, and the engine 12 can be more reliably prevented from rotating at a rotational speed exceeding the upper limit rotational speed.

Moreover, the control device for an automatic transmission according to the embodiment includes the normally-open linear solenoid valve SLT, the normally-closed linear solenoid valves SL1 to SL5, the normally-closed first and second on/off solenoid valves S1 and S2, the first clutch application relay valve 50 having the first signal pressure port 51a which switches between the normal mode, in which the linear solenoid valves SL1 to SL3 are connected to corresponding ones of the clutches C1 to C3, and the fail-safe mode, in which the drive pressure PD is selectively supplied to the clutches C1 and C2 and the line pressure PL is supplied to the clutch C3 to establish the third or fifth forward speed when all the solenoid valves SLT, SL1 to SL5, S1, and S2 are de-energized, and the first and second solenoid relay valves 60 and 65 configured to supply the S2 pressure from the second on/off solenoid valve S2 to the first signal pressure port 51a. Thus, the third or fifth forward speed can be established in the fail-safe mode by de-energizing all the solenoid valves SLT, SL1 to SL5, S1, and S2, and the neutral state can be established by energizing only the second on/off solenoid valve S2. As a result, the monitoring section 94 needs only to analyze the solenoid command signal output from the main control section 92 and to output a simple signal pattern. Thus, the monitoring section 94 can be simplified in configuration and reduced in size.

In the embodiment, as shown in FIG. 7, the AT ECU 90 is configured such that the main control section 92 is connected to one of the input terminals of each of the AND circuits 96a to 96g, the output terminal of each of the AND circuits 96a to 96g is connected to a corresponding one of the SLT circuit 98a, the SL1 circuit 98b, the SL2 circuit 98c, the SL3 circuit 98d, the SL5 circuit 98e, the S1 circuit 98f, and the S2 circuit 98g, and the monitoring section 94 is connected to the other input terminal of each of the AND circuits 96a to 96g and to the S2 circuit 98g not via the AND circuit 96g so that the monitoring section 94 outputs an off signal to each of the AND circuits 96a to 96g and an on signal to the S2 circuit 98g to establish the neutral state when an abnormality is occurring in the main control section 92. However, the present invention is not limited thereto, and any configuration in which the neutral state can be established irrespective of the solenoid command signals from the main control section 92 may be adopted. For example, the main control section 92 may be directly connected to the SLT circuit 98a, the SL1 circuit 98b, the SL2 circuit 98c, the SL3 circuit 98d, the SL5 circuit 98e, the S1 circuit 98f, and the S2 circuit 98g, the monitoring section 94 may be directly connected to the 52 circuit 98g, and a blocking circuit that de-energizes the solenoid valves SLT and SL1 to SL5 and the first on/off solenoid valve S1 in response to a signal from the monitoring section 94 may be provided separately.

In the embodiment, an abnormality in the solenoid command signals output from the main control section 92 is determined by the monitoring section 94 determining whether or not the gear ratio variation amount is equal to or less than the allowable gear ratio variation amount ΔGrlim and whether or not the post-shifting engine speed Ne* is equal to or less than the allowable rotational speed Nelim. However, the present invention is not limited thereto. For example, an abnormality in the solenoid command signals output from the main control section 92 may be determined by analyzing a combination of the currently established shift speed and the solenoid command signals output from the main control section 92 to the solenoid valves SLT, SL1 to SL5, S1, and S2 to determine whether or not a change that is not normally made if the main control section 92 is normal (such as a change from the sixth forward speed to the first forward speed and a change from the first forward speed to the sixth forward speed, for example) is to be made. Alternatively, it may be determined whether or not the solenoid command signals output from the main control section 92 are normal by comparing the number of clutches and brakes that need to be engaged for the currently established shift speed and the number of clutches and brakes that are actually engaged to determine whether or not both the numbers coincide with each other. The determination as to whether or not a clutch or a brake is actually engaged may be made using a detected value from a hydraulic pressure sensor attached to an oil passage connected to an oil chamber corresponding to the clutch or brake, or by detecting a feedback current reflecting a current applied to a corresponding solenoid. Instead of determining an abnormality in the solenoid command signals output from the main control section 92 as described above, an abnormality in the main control section 92 may be determined directly by monitoring an abnormality in the main control section 92 using a watchdog timer, monitoring an abnormality in the main control section 92 through echo back of communication data, or the like, for example.

In the embodiment, the first solenoid relay valve 60 switches between the mode in which the modulator pressure PMOD is output to the first signal pressure port 51a of the first clutch application relay valve 50 using either of the SL1 pressure from the linear solenoid valve SL1 and the SL2 pressure from the linear solenoid valve SL2 as the signal pressure and the mode in which the S2 pressure from the second on/off solenoid valve S2 is output to the first signal pressure port 51a. However, the S2 pressure from the second on/off solenoid valve S2 may be directly output to the first signal pressure port 51a. At this time, the second on/off solenoid valve S2 may be turned on to output the S2 pressure to the first signal pressure port 51a even while the vehicle is running using one of the first to sixth forward speeds. In this case, the first solenoid relay valve 60 may be omitted.

In the embodiment, the neutral state is established by energizing only the second on/off solenoid valve S2 to drive the first clutch application relay valve 50 using the S2 pressure. However, the present invention is not limited thereto. The first clutch application relay valve 50 includes the third signal pressure port 51*l* to which a hydraulic pressure from the linear solenoid valve SLT is input as a signal pressure. Therefore, the neutral state may be established by causing the normally-open linear solenoid valve SLT to output a low hydraulic pressure, that is, by applying a high current Ihi to the normally-open linear solenoid valve (an electromagnetic coil) SLT. However, as discussed above, when the high current Ihi is applied to the linear solenoid valve SLT, the hydraulic oil may not be sufficiently supplied to the cooler or the portion to be lubricated to result in insufficient cooling or insufficient lubrication.

In the embodiment, the second clutch application relay valve 55 exclusively establishes the third forward speed when a failure occurs while the vehicle is running using a lower speed including the first to third forward speeds, and exclusively establishes the fifth forward speed when a failure occurs while the vehicle is running using a higher speed including the fourth to sixth forward speeds. However, a specific shift speed may be exclusively established at all times when a failure occurs while the vehicle is running using any of the first to sixth forward speeds. In this case, the second clutch application relay valve 55 may be omitted.

In the embodiment, the main control section 92 determines an abnormality in the automatic transmission 20 by determining whether or not the actual speed ratio γ falls within the allowable gear ratio range, whether or not a solenoid electrical failure is occurring, and whether or not a valve stick is occurring. However, some of such determinations may be omitted, and determinations other than such determinations may be executed in addition.

In the embodiment, the main control section 92 receives the vehicle speed V and the input shaft speed Nin and the monitoring section 94 receives the vehicle speed V and the current gear ratio Or (currently established shift speed) as the state of the automatic transmission 20 (shifting state). However, the monitoring section 94 may use any data on the state of the automatic transmission 20 as long as the monitoring section 94 can determine an abnormality on the basis of the solenoid command signals set by the main control section 92.

In the embodiment, the 6-speed speed change mechanism 30 which provides first to sixth forward speeds is incorporated. However, the present invention is not limited thereto, and an automatic transmission that provides any number of speeds such as 4-speed, 6-speed, and 8-speed automatic transmissions may be incorporated. The shift speeds established when all the solenoid valves SLT, SL1, SL2, SL3, SL5, S1, and S2 are de-energized are not limited to the third and fifth forward speeds, and may be any shift speed.

The correspondence between the main elements of the embodiment and the main elements of the invention described in the "SUMMARY OF THE INVENTION" section will be described. In the embodiment, the hydraulic circuit 40 corresponds to the "actuator". The main control section 92 corresponds to the "main control section". The monitoring section 94 corresponds to the "monitoring section". The clutches C1 to C3 and the brakes B1 and B2 correspond to the "friction engagement element". The mechanical oil pump 42 corresponds to the "pump". The primary regulator valve 44, the linear solenoid valve SLT, and so forth correspond to the "first pressure regulation mechanism". The linear solenoid valves SL1 to SL3 correspond to the "second pressure regulation mechanism". The second on/off solenoid valve S2 corresponds to the "signal pressure output mechanism". The first clutch application relay valve 50, the second clutch application relay valve 55, the first solenoid relay valve 60, the second solenoid relay valve 65, the C3-B2 application control valve 70, the B2 application control valve 75, and so forth correspond to the "switching mechanism". The correspondence between the main elements of the embodiment and the main elements of the invention described in the "SUMMARY OF THE INVENTION" section does not limit the elements of the invention described in the "SUMMARY OF THE INVENTION" section, because such correspondence is an example given for the purpose of specifically describing the embodiment described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While a mode for carrying out the present invention has been described above by way of an embodiment, it is a matter of course that the present invention is not limited to the embodiment in any way, and that the present invention may be implemented in various forms without departing from the scope and sprit of the present invention.

The present invention may be applied to the automotive industry.

What is claimed is:

1. A control device for an automatic transmission that is configured to output a command signal to an actuator to control the automatic transmission, comprising:

a main control section that is configured to receive a state of the automatic transmission, that is configured to determine an abnormality in the automatic transmission on the basis of an input state of the automatic transmission, and that is configured to output to the actuator a main control section command signal for controlling the automatic transmission so as to establish a predetermined shift speed when it is determined that an abnormality is occurring in the automatic transmission; and a monitoring section that is configured to determine an abnormality in the main control section and that is configured to output to the actuator a monitoring section command signal for causing the automatic transmission to establish a neutral state while blocking output of the main control section command signal when it is determined that an abnormality is occurring in the main control section, wherein:

the monitoring section is configured to receive a state of the automatic transmission and the main control section command signal that is output from the main control section, and is configured to determine the abnormality in the main control section on the basis of the input state of the automatic transmission and the main control section command signal, the control device is configured to control the automatic transmission which includes a hydraulic circuit including a plurality of solenoids as the actuator, the predetermined shift speed is established by de-energizing all the plurality of solenoids and the neutral state is established by energizing only a predetermined one of the plurality of solenoids and de-energizing the other solenoids, the main control section is configured to output the main control section command signal to each of the plurality of solenoids, and the monitoring section is configured to output a signal for energizing the predetermined solenoid and de-energizing the other solenoids as the monitoring section command signal when it is determined that an abnormality is occurring in the main control section.

2. The control device for an automatic transmission according to claim 1, wherein
the monitoring section is configured to determine that an abnormality is occurring in the main control section and is configured to output to the actuator the monitoring section command signal for causing the automatic transmission to establish the neutral state when the input main control section command signal is a command for a change to a shift speed that is different from a shift speed that is normally taken from the input state of the automatic transmission.

3. The control device for an automatic transmission according to claim 1, which is configured to control the automatic transmission which is configured to transfer power from a motor to a drive shaft while changing a speed of the power, wherein
when the actuator is drivably controlled on the basis of the input main control section command signal, the monitoring section is configured to determine that an abnormality is occurring in the main control section and is configured to output to the actuator the monitoring section command signal for causing the automatic transmission to establish the neutral state when a rotational speed of the motor is determined to exceed an allowable rotational speed.

4. The control device for an automatic transmission according to claim 1, wherein
when the actuator is drivably controlled on the basis of the input main control section command signal, the monitoring section is configured to determine that an abnormality is occurring in the main control section and is configured to output to the actuator the monitoring section command signal for causing the automatic transmission to establish the neutral state when a degree of variation in speed reduction ratio of the automatic transmission is determined to exceed a predetermined degree.

5. The control device for an automatic transmission according to claim 1, wherein
the main control section is configured to determine the abnormality by determining a shift speed that cannot be established, of the plurality of shift speeds, and setting a shift speed that can be established to output a command signal to the actuator.

6. The control device for an automatic transmission according to claim 1, which controls the automatic transmission which includes, as the hydraulic circuit which supplies a hydraulic pressure to a hydraulic servo for a friction engagement element that is configured to establish a shift speed:
a pump that is configured to generate a hydraulic pressure;
a first pressure regulation mechanism that includes a normally-open solenoid and that is configured to regulate the hydraulic pressure from the pump to generate a line pressure;
a second pressure regulation mechanism that includes a normally-closed solenoid and that is configured to receive and regulate the line pressure to output regulated pressure;
a signal pressure output mechanism that includes a normally-closed solenoid to output a signal pressure; and
a switching mechanism that is connected to oil passages for the respective first pressure regulation mechanism, second pressure regulation mechanism and signal pressure output mechanism and an oil passage for the hydraulic servo and that includes a signal pressure oil passage to which at least the signal pressure from the signal pressure output mechanism can be input,
the switching mechanism allowing communication between the oil passage for the first pressure regulation mechanism and the oil passage for the hydraulic servo and blocking communication between the oil passage for the second pressure regulation mechanism and the oil passage for the hydraulic servo when the signal pressure is not input to the signal pressure oil passage, and
the switching mechanism blocking communication between the oil passage for the first pressure regulation mechanism and the oil passage for the hydraulic servo and allowing communication between the oil passage for the second pressure regulation mechanism and the oil passage for the hydraulic servo when the signal pressure is input to the signal pressure oil passage, wherein
the monitoring section is configured to output an on signal to the solenoid for the signal pressure output mechanism which serves as the predetermined solenoid.

* * * * *